United States Patent [19]

Sakai

[11] Patent Number: 5,872,433
[45] Date of Patent: Feb. 16, 1999

[54] IMAGE PICKUP APPARATUS INCLUDING INTERRUPTION MEANS FOR CAUSING RECORDATION OF AN ELECTRICAL IMAGE SIGNAL IN RESPONSE TO OPERATION OF A SECOND TRIGGER BEFORE COMPLETION OF A PREDETERMINED STEP BY A FIRST TRIGGER

[75] Inventor: Shinji Sakai, Yokohama, Japan

[73] Assignee: Canon Kabushiki Kaisha, Tokyo, Japan

[21] Appl. No.: 526,986

[22] Filed: Sep. 12, 1995

Related U.S. Application Data

[62] Division of Ser. No. 180,775, Jan. 10, 1994, which is a continuation of Ser. No. 868,691, Apr. 15, 1992, abandoned, which is a division of Ser. No. 51,458, May 19, 1987, Pat. No. 5,170,069.

[30] Foreign Application Priority Data

May 21, 1986 [JP] Japan ................... 61-116960
May 21, 1986 [JP] Japan ................... 61-116961
May 21, 1986 [JP] Japan ................... 61-116962
May 21, 1986 [JP] Japan ................... 61-116963
May 21, 1986 [JP] Japan ................... 61-116965

[51] Int. Cl.$^6$ ......................................... H02P 1/00
[52] U.S. Cl. ................................. 318/139; 318/106
[58] Field of Search ........................... 318/139, 105–110; 396/49, 301, 302, 303; 307/18–26, 29, 38, 39, 41, 64–66, 85, 86

[56] References Cited

U.S. PATENT DOCUMENTS 3,818,237 6/1974 Straus ........................................... 307/64
3,827,067 7/1974 Yamamichi .
3,842,587 10/1974 Strauss et al. .
4,345,286 8/1982 Kanayama et al. ..................... 360/137
4,435,058 3/1984 Yoshida et al. .
4,464,037 8/1984 Terui et al. .
4,471,233 9/1984 Roberts ..................................... 307/66
4,575,640 3/1986 Martin ...................................... 307/23
4,645,325 2/1987 Inoue et al. .............................. 396/301
4,782,355 11/1988 Sakai et al. .
4,788,480 11/1988 Field et al. .............................. 318/442
4,797,567 1/1989 Pappas ..................................... 307/66
4,816,862 3/1989 Taniguchi et al. .
4,818,891 4/1989 Drinkwater .............................. 307/64
4,827,150 5/1989 Reynal ..................................... 307/66
4,841,324 6/1989 Ogasawara .
4,875,539 10/1989 Abukawa et al. ...................... 180/446
5,027,150 6/1991 Inoue et al. .............................. 396/48
5,130,742 7/1992 Miyamoto et al. .
5,170,069 12/1992 Sakai ........................................ 307/43
5,471,353 11/1995 Codilian et al. ..................... 360/73.03
5,485,073 1/1996 Kasashima et al. ...................... 320/15
5,532,563 7/1996 Kodama et al. ........................ 318/440

*Primary Examiner*—Brian Sircus
*Attorney, Agent, or Firm*—Fitzpatrick, Cella, Harper & Scinto

[57] ABSTRACT

A recording or reproducing apparatus has a motor for use in relative displacement of a recording medium and a head at high speed and a booster circuit for supplying power to the internal circuit. The apparatus also includes control means which control actuation of the booster circuit after the motor is supplied with a relatively large current, if a first power supply capable of discharging a relatively large current is used. The control means causes a relatively small current to be supplied to the motor after the booster circuit is actuated if a second power supply capable of discharging only a relatively small current is used.

6 Claims, 18 Drawing Sheets

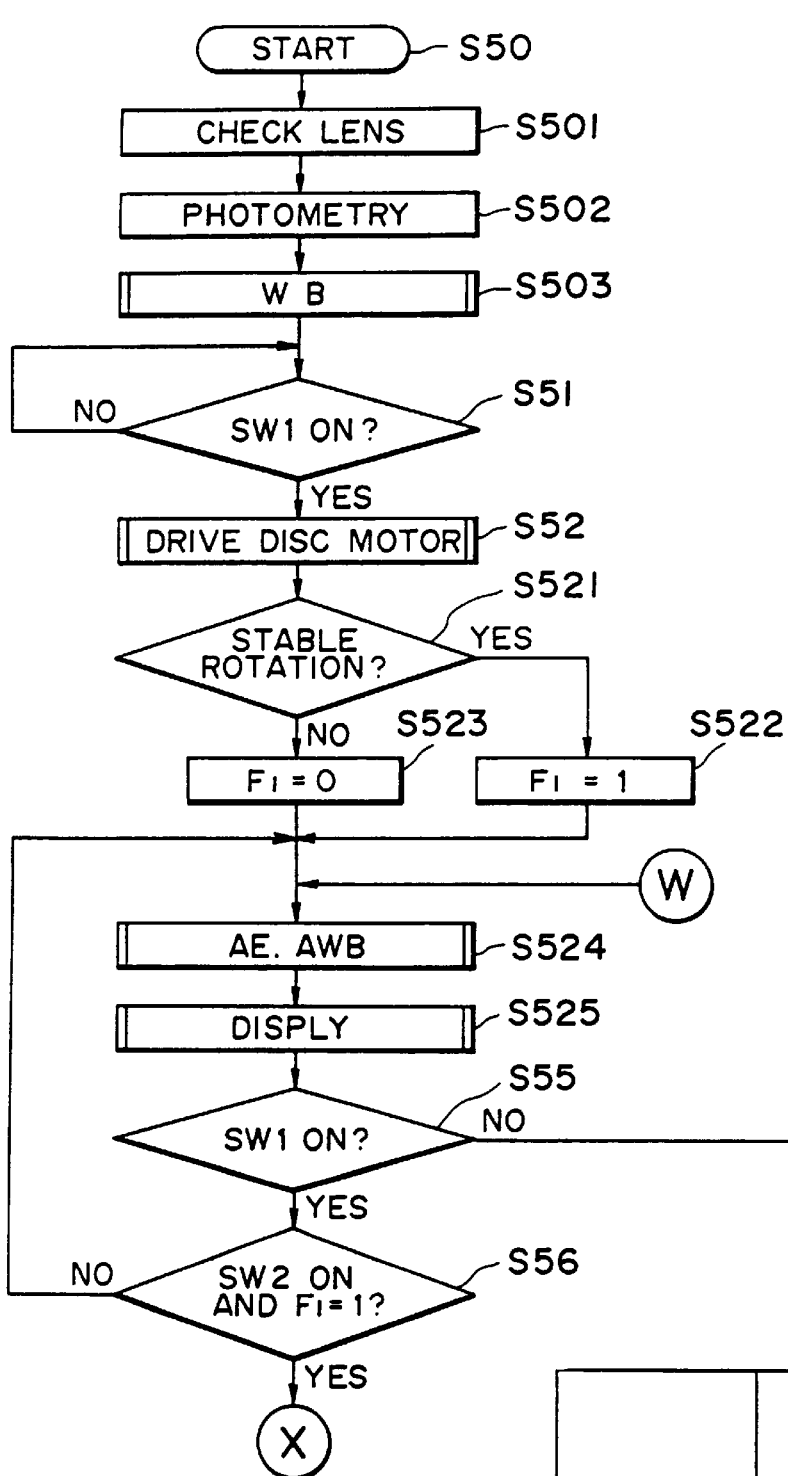
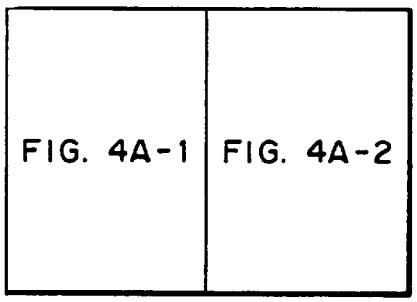
FIG. 4A-1
FIG. 4A

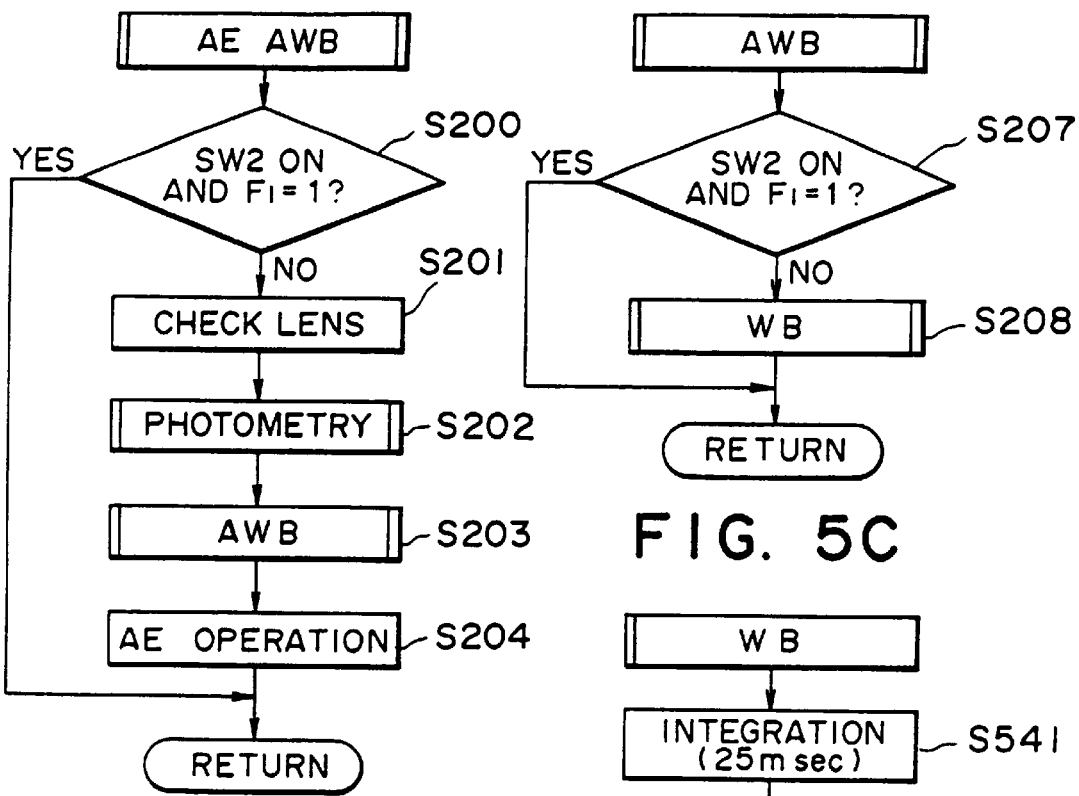
FIG. 5A
FIG. 5C
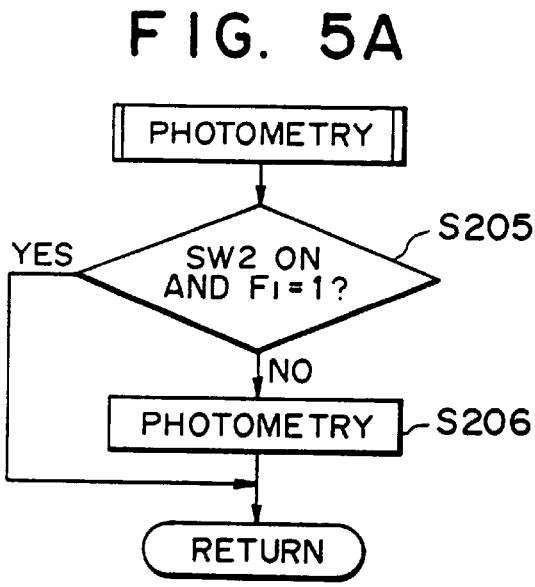
FIG. 5B
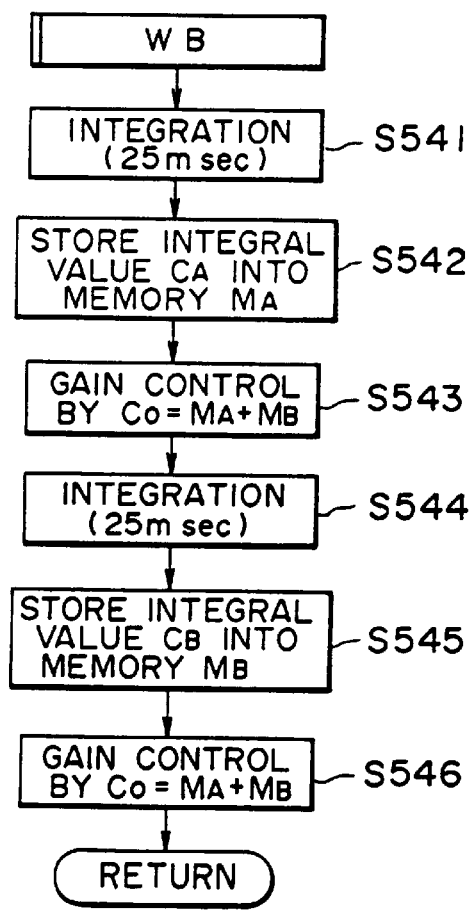
FIG. 5D

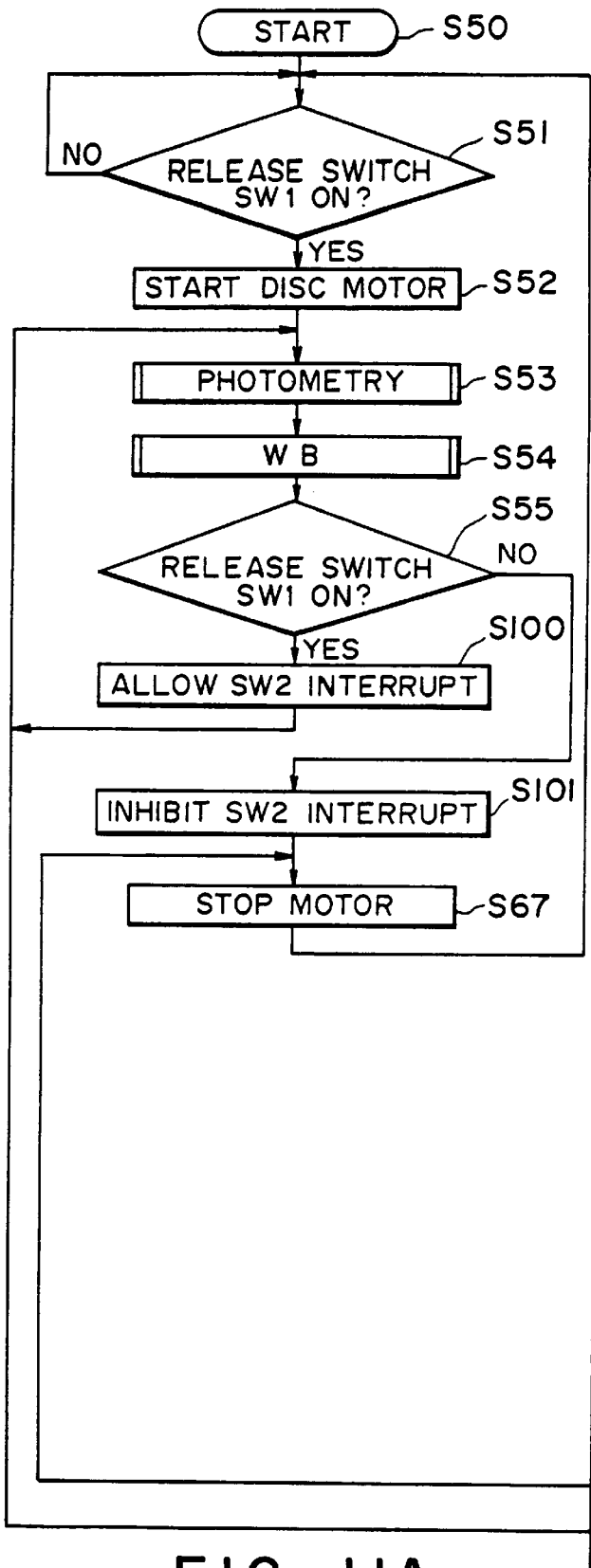

IMAGE PICKUP APPARATUS INCLUDING INTERRUPTION MEANS FOR CAUSING RECORDATION OF AN ELECTRICAL IMAGE SIGNAL IN RESPONSE TO OPERATION OF A SECOND TRIGGER BEFORE COMPLETION OF A PREDETERMINED STEP BY A FIRST TRIGGER

This application is a division of application Ser. No. 08/180,775 filed Jan. 10, 1994, which is a continuation of application Ser. No. 07/868,691, filed Apr. 15, 1992, now abandoned, which is a division of application Ser. No. 07/051,458, filed May 19, 1987, and which issued as U.S. Pat. No. 5,170,069, on Dec. 8, 1992.

BACKGROUND OF THE INVENTION

1. Field of the Invention

The present invention relates to an image pickup apparatus capable of picking up and recording a still image at high speed without using an interruption routine.

2. Related Background Art

A method of using an interruption function of a CPU in a microprocessor has been proposed for sequence control of a camera system. With this method, as the shutter is half depressed and switch SW1 is turned on, the microprocessor checks a disc drive and a lens, calculates photometry and automatic exposure, displays information in a finder and performs other operations. The calculated photometry and automatic exposure are temporarily stored in a provisional memory and transferred to a regular memory after an interruption is inhibited. Thereafter, the interruption is enabled to repeat an operation of checking the depression of switch SW1. During this loop, if an interruption occurs due to the depression of switch SW2 triggering a shutter release, the microprocessor enters in the interruption routine to initiate the release sequence and pick up an image using the information in the regular memory.

With this method, however, the sequence control jumps to the interruption routine and an image is picked up, even if a lens stop value changes due to zoom adjustment during the loop operation, or without completing the photometry. In such a case, a correct exposure cannot be obtained.

Further, the provisional and regular memories are required because of the interruption process. Thus, the memory capacity becomes two times larger than that without the interruption process, and the program becomes complicated.

A method for the sequence control without the use of interruption function may be possible. With this method, however, an image pickup sequence can be carried out only after various data such as photometry and lens data are collected, thus leading to a time lag between the depression of the release switch and an actual image pickup.

There is known a silver salt SLR camera of a type in which automatic exposure (AE) information is produced for each frame during a single frame photographing mode, and is fixed during a high speed continuous photographing mode (e.g., refer to Japanese Patent Unexamined Publication No. 143218/1978).

The reason why the AE information is fixed during the high speed continuous photographing mode, is that AE sensors are generally mounted within a TTL (Through the Taking Lens) optical path and a quick-return mirror is maintained set up so that light is not incident to the AE sensors.

In contrast, there is also known a video camera as disclosed, for example, in Japanese Patent Unexamined Publication No. 78925/1976, wherein color sensors for detecting R and B (G) color temperatures are mounted on a video camera body. An output ratio between the color sensors is calculated to form color temperature information based on which the color balance of the color signal processing circuit of the camera is adjusted.

An image pickup apparatus such as an electronic still camera adopting the above video camera technique picks up one frame and stores it in a medium such as a magnetic disc. In addition to this fundamental mode, a continuous photographing mode will become necessary for some cases.

With the image pickup apparatus of this type, the output of the color temperature sensor can be always obtained independently from image pickup control, stop control and the like. However, during a high speed continuous photographing mode, there is a problem that the color temperature changes at the frequency two times higher than the commercial power frequency due to flicker phenomenon of a fluorescent lamp. Thus, color changes for each photographed print. This color difference is not so conspicuous for plural prints photographed at relatively low speed, but becomes conspicuous for those photographed at high speed, e.g., 10 frames per second.

To drive a recording or reproducing apparatus with an image pickup apparatus such as a video camera, a battery and an AC adapter have been used selectively.

If a battery having a capacity maintaining a sufficient voltage during large current discharge is used, e.g., if a Ni—Cd battery is used, a motor can be started rapidly. However, if an AC adapter is to be used for the purpose of long time, indoor image regeneration or recording, a large capacity of an AC adapter is needed for large current discharge, and hence it becomes expensive. If an AC adapter of small capacity is used for large current discharge, the voltage will become low and a malfunction may occur.

Electronic apparatus such as an electronic camera often use a battery for their power supply. In this case, the voltage will become low as large current flows for a long time, especially at the end of battery discharge and at low temperature. For this reason, several motors or the like in the electronic camera are driven in such a manner that power consumptions (or peak power consumptions) of these devices do not occur at the same time.

However, this drive operation is sequential in time so that there arises some problems of long time image pickup and record operation, long time release stand-by, large release time lag, long return time of a quick-turn mirror for a single-lens reflex camera, low frame speed for continuous photographing, and the like.

There is known an image pickup apparatus of the type in which gains of color signal passages in a signal processing circuit are automatically adjusted by photographing a white object and making the obtained color signal levels equal to each other.

There is also known an image pickup apparatus of the type in which a plurality of color sensors for receiving light from an object are mounted outside of a TTL optical path. The outputs of the color sensors are compared to calculate color temperature information. The gains of color signal passages from the image pickup elements are always controlled based on the color temperature information.

With the former image pickup apparatus, initial setting for white balance is cumbersome. With the latter image pickup apparatus, an electronic camera is constructed of a shutter, a quick-return mirror, a stop and the like which devices are driven every time a trigger is initiated. Such an electronic camera is associated with a problem that too large a time is necessary for image photographing and recording after triggering operation. Particularly, a microcomputer is generally used for giving various functions to an electronic camera and controlling various devices of the camera. Complicated operations in various modes are executed after the triggering operation. Therefore, if the white balance control operation periodically reading the color sensor outputs is inserted between various sequential operations, the final image photographing and recording operation is delayed thus taking a long time for one frame image pickup.

SUMMARY OF THE INVENTION

It is a principal object of the present invention to provide an image pickup apparatus capable of photographing without a time lag.

It is another object of the present invention to provide an image pickup apparatus usable with a small memory capacity and capable of controlling an exposure precisely.

It is a further object of the present invention to provide an image pickup apparatus capable of properly controlling a white balance during a high speed continuous photographing mode.

It is a still further object of the present invention to provide an image pickup apparatus capable of preventing a malfunction caused by a rapid voltage drop of an AC adapter by making power consumptions not occur at the same time, and ensuring a rapid response of the apparatus if a battery is used for the power supply.

It is another object of the present invention to eliminate the above prior art problems and provide an electronic device capable of preventing a malfunction caused by a rapid voltage drop of a battery and reducing a time loss in operation.

It is a further object of the present invention to provide an image pickup apparatus capable of adjusting a white balance and photographing and recording a still image rapidly.

To achieve the above objects, the image pickup apparatus according to an embodiment of this invention comprises means for picking up an optical image; trigger means for initiating an image pickup by said image pickup means; and control means performing a preparation step for preparing an image pickup prior to initiation of an image pickup by said trigger means, and a judgement step responsive to said trigger means and included in said preparation step for omitting the following preparation step and initiating an image pickup.

Since control means carries out the preparation step for preparing an image pickup (such as photometry, white balance adjustment and the like) prior to initiation of an image pickup by trigger means, an image can always be picked up with correct exposure and other settings. Further, since the judgement step is included in the preparation step, the following preparation step is omitted when a trigger signal is generated by trigger means and an image pickup operation is carried out. Thus, without using an interruption routine, an image can be picked up quickly.

The image pickup apparatus according to another embodiment of the invention comprises color image pickup means for converting an optical image into an electric signal; color balance adjustment means for adjusting color balance of the output from said color image pickup means in accordance with a color temperature of an object; and control means for switching between two operations, one for fixing a color balance status adjusted by said color balance adjustment means in a first mode where said image pickup means picks up images continuously at relatively high speed, and the other for causing said color balance adjustment means to adjust a color balance for each image in a second mode where said image pickup means picks up images continuously at relatively low speed or picks up one image.

Since the color balance of a plurality of consecutive images picked up in a high speed continuous photographing mode often used for comparison between the images does not change, consecutive images each showing a small difference from another can be properly compared without difficulty.

In the image pickup apparatus according to another embodiment of the invention, the recording or reproducing apparatus having a motor for use in relative displacement of a recording medium and a head at high speed and a booster circuit for supplying power to the internal circuit comprises control means. When a first power supply capable of discharging a relatively large current is used, said control means actuates said booster circuit after said motor is supplied with a relatively large current. Whereas when a second power supply capable of discharging only a relatively small current is used, said control means causes a relatively small current to be supplied to said motor after said booster circuit is actuated.

When the first power supply capable of discharging a relatively large current is used, control means causes the booster circuit to be actuated under control of the control means after the motor is supplied with a relatively large current. Therefore, the motor is started quickly with priority over the others. Further, when the second power supply capable of discharging only a relatively small current is used, control means causes the motor to be supplied with a relatively low current after the booster circuit is actuated. Therefore, the current through the booster circuit and the motor does not flow at the same time, thereby preventing a malfunction caused by a voltage drop.

The image pickup apparatus according to another embodiment of the invention comprises image pickup means for converting incident light from an object into an electric signal; color temperature detecting means for detecting color temperature information of incident light; drive means for changing the status of incident light; and control means for causing said drive means to change the status of incident light from an initial status to a predetermined status at the start of image pickup, and obtaining a white balance based on the output from said detecting means before said change is completed.

Control means causes drive means to change the status of incident light from the initial status to the predetermined status at the start of image pickup. A white balance is obtained before the change is completed. Therefore, a precise white balance based on the color temperature information just before an image pickup operation can be obtained without a time lag.

The electric device according to another embodiment of this invention comprises discrimination means for discriminating between a first status indicating that a power supply capability has been degraded and a second status indicating that a power supply capability is not degraded; and control means for switching between two operations based on an output from said discrimination means, one for supplying power to a plurality of drivers substantially at the same time, and the other for supplying power to said plurality of drivers sequentially by a predetermined interval.

Discrimination means judges if the power supply capability has been degraded or not. Based on this judgement, control means switches between the two operations, one for supplying power to the plurality of motors substantially at the same time and the other for supplying sequentially by the predetermined interval. Therefore, the overall system operates quickly if the power supply capability is sufficient, whereas it operates slowly if the capability has been degraded. Thus, a rapid voltage drop is avoided to accordingly extend the service life of the power supply.

The other objects and aspects of the present invention will become apparent from the following detailed description and the accompanying drawings.

BRIEF DESCRIPTION OF THE DRAWINGS

FIGS. 5A to 5F are flow charts showing the main part of the flow charts of FIGS. 4A and 4B;

DETAILED DESCRIPTION OF THE PREFERRED EMBODIMENTS

Figure 1:
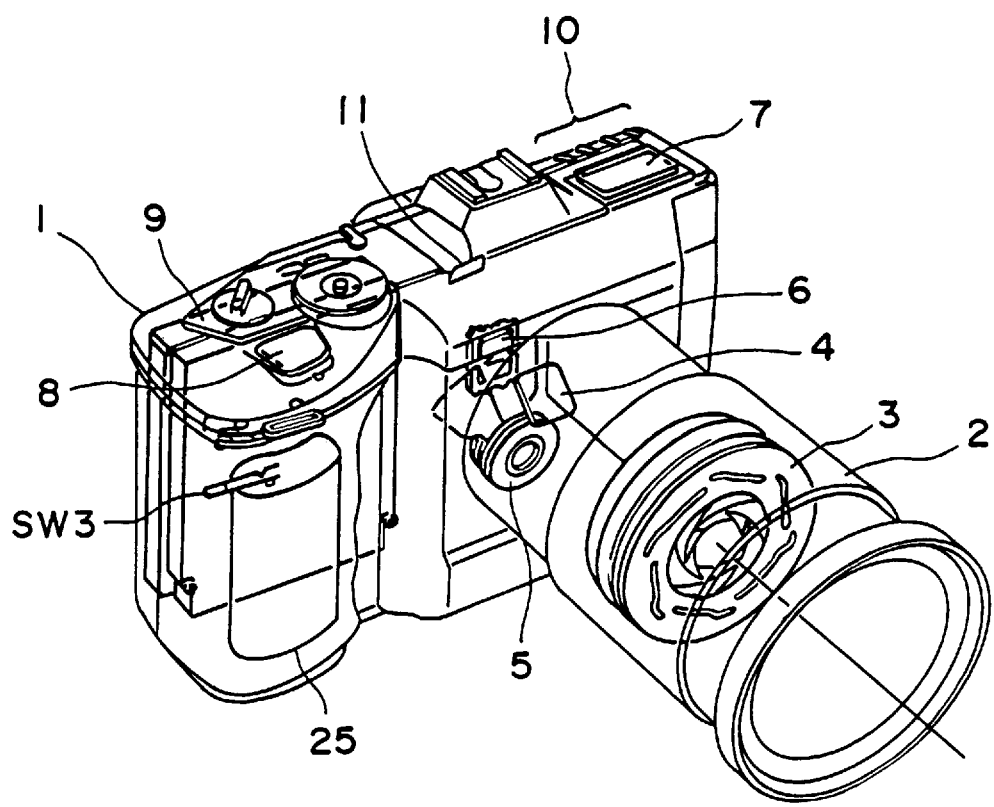
FIG. 1 is a perspective view showing an example of an image pickup apparatus embodying the present invention.

FIG. 1 is a perspective view showing an example of the construction of the image pickup apparatus according to an embodiment of the present invention. The apparatus shown in FIG. 1 is constructed of a body 1, a lens barrel 2, a stop or aperture 3, a quick-return mirror 4, a shutter unit 5, an image pickup element 6, an LCD display 7, a two-stroke release switch 8, a magnetic disk drive unit 9, a continuous photographing mode switching control unit 10, a color temperature detecting sensor window 11, and a battery package or an AC adapter package 25 which can be replaced within the body 1. SW3, as will be described later, discriminates between the battery package and the AC adapter package.

A battery is a first power supply capable of discharging a relatively large current, whereas an AC adapter is a second power supply capable of discharging only a relatively small current.

Figure 2:
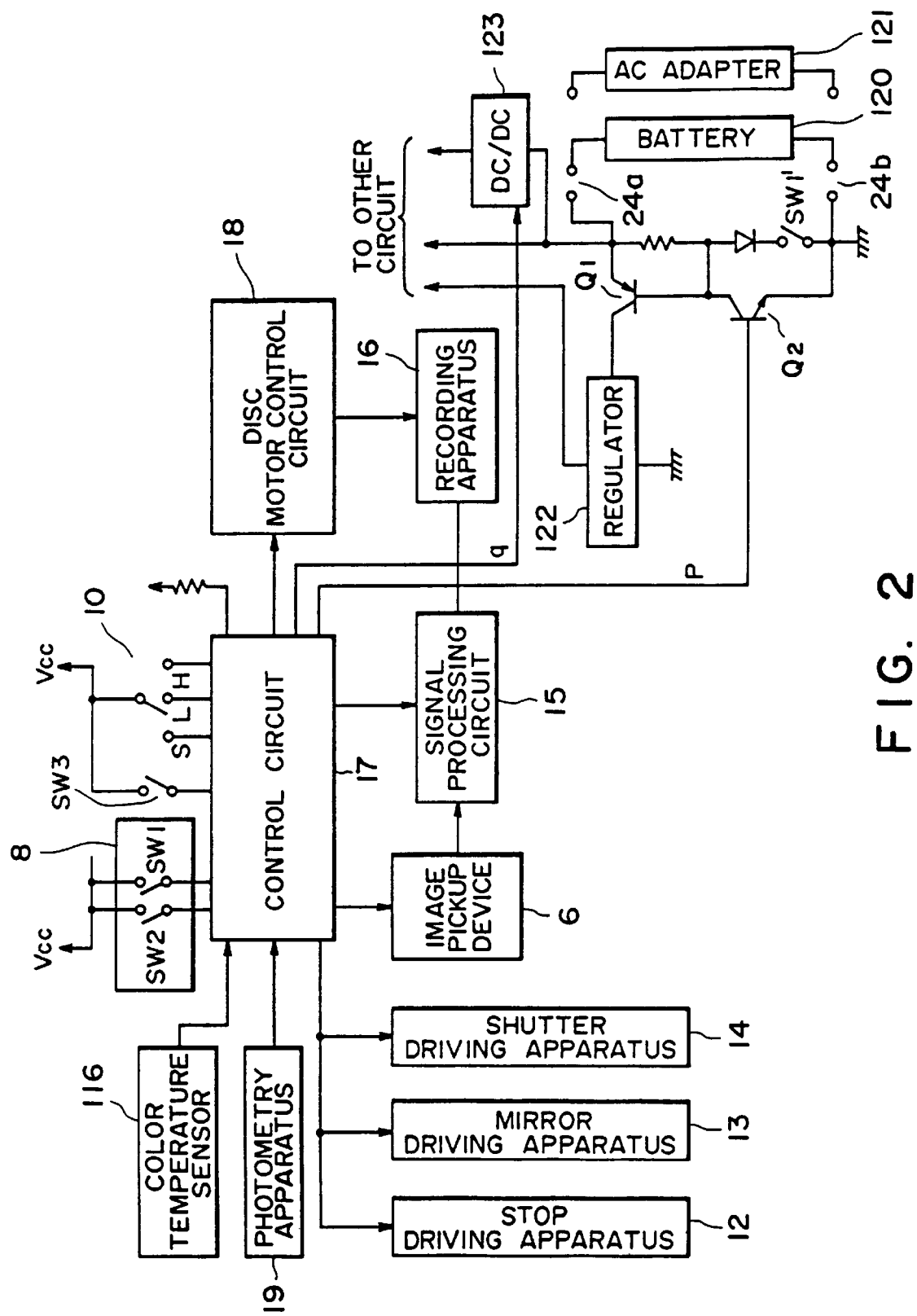
FIG. 2 is a block diagram showing the main part of the circuit included in the apparatus of FIG. 1.

FIG. 2 is a block diagram showing an example of the circuit used in the image pickup apparatus according to the embodiment of the present invention. The circuit is constructed of a stop driving apparatus 12, a mirror driving apparatus 13, a shutter driving apparatus 14, a signal processing circuit 15 for processing the output from the image pickup element 6, a recording apparatus 16, and other elements. A color temperature sensor 116 detects a color temperature of light incident from the sensor window 11. A photometry apparatus 19 measures an object brightness by receiving a part of light guided to a finder optical system (not shown) via the quick-return mirror 4.

A control circuit 17 includes a microcomputer. A disk motor control circuit 18 is used for controlling the rotation of a magnetic disc within the recording apparatus. As the recording medium, a magnetic tape may be used instead of a magnetic disc. Also a head may be driven at high speed instead of rotating a disc at high speed.

The release switch 8 includes switch SW1 turning on at a first stroke, and switch SW2 turning on at a second stroke.

The continuous photographing mode switching control unit 10 can select one of three modes, i.e., a single shot mode S, a low speed continuous photographing mode L (2 frames/sec) and a high speed continuous photographing mode H (10 frames/sec).

Figure 6A:
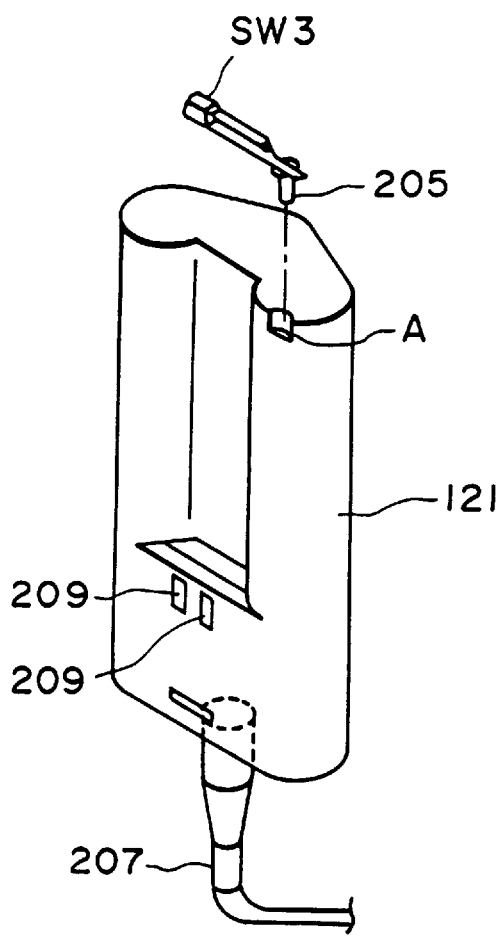
FIGS. 6A and 6B are views respectively showing an AC adapter package and a battery package.
Figure 6B:
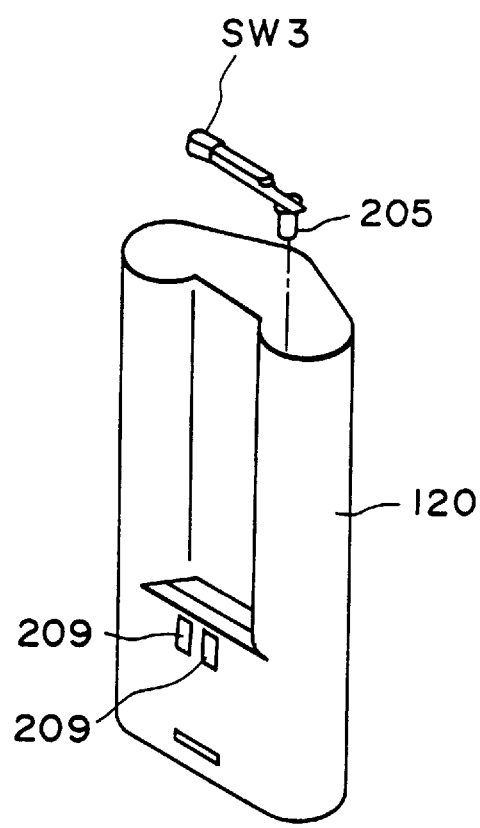

The packages for a battery 120 and an AC adapter 121 have, as shown in FIGS. 6A and 6B, a recess A for an AC adapter but have no recess for a battery. Therefore switch SW3 turns off when an AC adapter is used, whereas it turns on when a battery is used. A regulator 122 supplies power to the disk motor and the like. A DC/DC converter 123 serving as a booster supplies power to the image pick up elements and others. Q1 and Q2 denote switching transistors. The battery 120 and the AC adapter 121 are selectively connected between terminals 24a and 24b. When SW1' is actuated in cooperation with the first release switch SW1, or transistor Q2 is turned on, transistor Q1 is turned on to feed the output of the battery 120 or the AC adapter 121 to the regulator 122 whereat the power is stabilized and supplied to necessary circuits (such as a disk motor in the disk motor control circuit). Power is also supplied to the DC/DC converter 123 when SW1' is turned on whereat the power is boosted and supplied to the image pickup element 6 and the like for driving the same.

The battery 20 may be chargeable or not so long as it can discharge a large current. The AC adapter 121 is of the type that can discharge only a small current.

Figure 3:
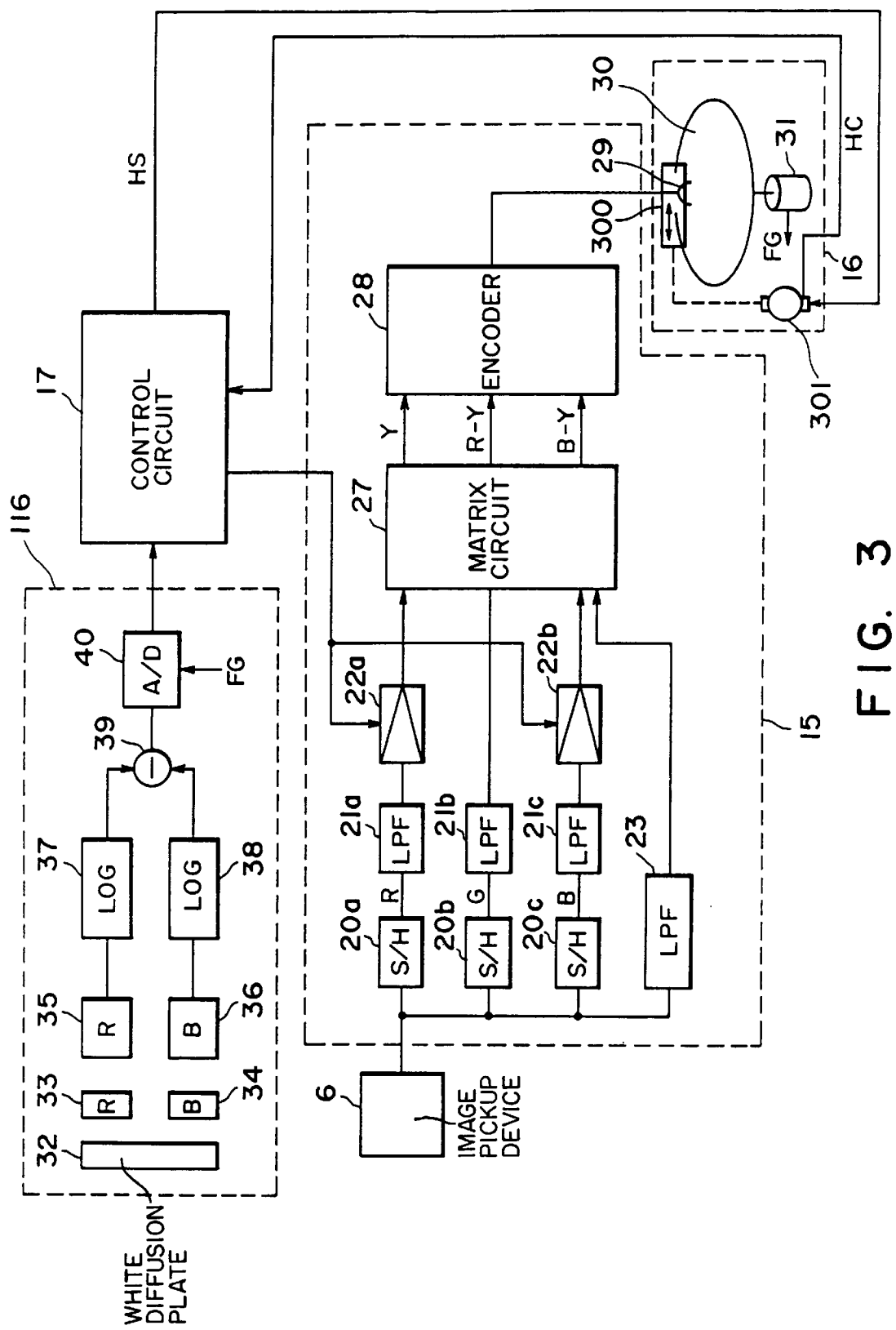
FIG. 3 is a block diagram showing the main part of the circuit shown in FIG. 2.

FIG. 3 is a block diagram showing the main part of the circuit shown in FIG. 2. Sample/hold circuits 20a to 20c in the signal processing circuit 15 are controlled by sample/hold pulses shifted in phase by 120 degrees. R, G and B stripe filters (not shown) are attached on the front surface of the image pickup element 6 in the vertical scan direction. The width of each stripe filter equals to that of a pixel. Since the horizontal line signal for the image pickup element 6 is constructed of R, G and B point sequential signals, each R, G and B signal is separated by the sample/hold circuits 20a to 20c.

Low pass filters (LPF) 21a to 21c have a cut-off frequency of 0.5 MHz. An LPF 23 has a cut-off frequency of 3 MHz and forms a high band luminance signal Y. Gain control amplifiers 22a and 22b are provided for R and B channels. A matrix circuit 27 forms Y, R-Y and B-Y signals from Y, R, G and B signals. An encoder 28 generates composite video signals which are recorded on the disc 30 through the head 29 one-field signal per one track. A disc motor 31 rotates at 3600 rpm and generates fifteen periodic FG (Frequency Generating) pulses per one rotation at equal intervals. A stepping motor 301 drives the disc motor 31 to shift the head by means of a head carriage 300 on which the head 29 is mounted.

A white diffusion plate 32 fitted into the window 11 formed in the camera body receives environmental light (light source). R and B filters 33 and 34 applies red and blue light to light receiving elements 35 and 36, respectively. The outputs IR and IB from the light receiving elements 35 and 36 are amplified and subjected to logarithmic compression by logarithmic amplifiers 37 and 38 to obtain logIR and logIB.

A subtracter 39 operates to obtain logIR−logIB=logIR/IB. IR/IB corresponds to a color temperature. An A/D converter 40 samples the output of logIR/IB from the subtracter 39 in response to the FG pulses and converts it into a color temperature digital signal which is inputted to the control circuit 17.

The control circuit 17 controls the gains of the gain control amplifiers 22a and 22b in accordance with the color temperature signal. Namely, as IR/IB becomes large, i.e., as the color temperature becomes low, the gain of the gain control amplifier 22a is lowered, whereas the gain of the gain control amplifier 22b is made high.

Figures 2, 4A:
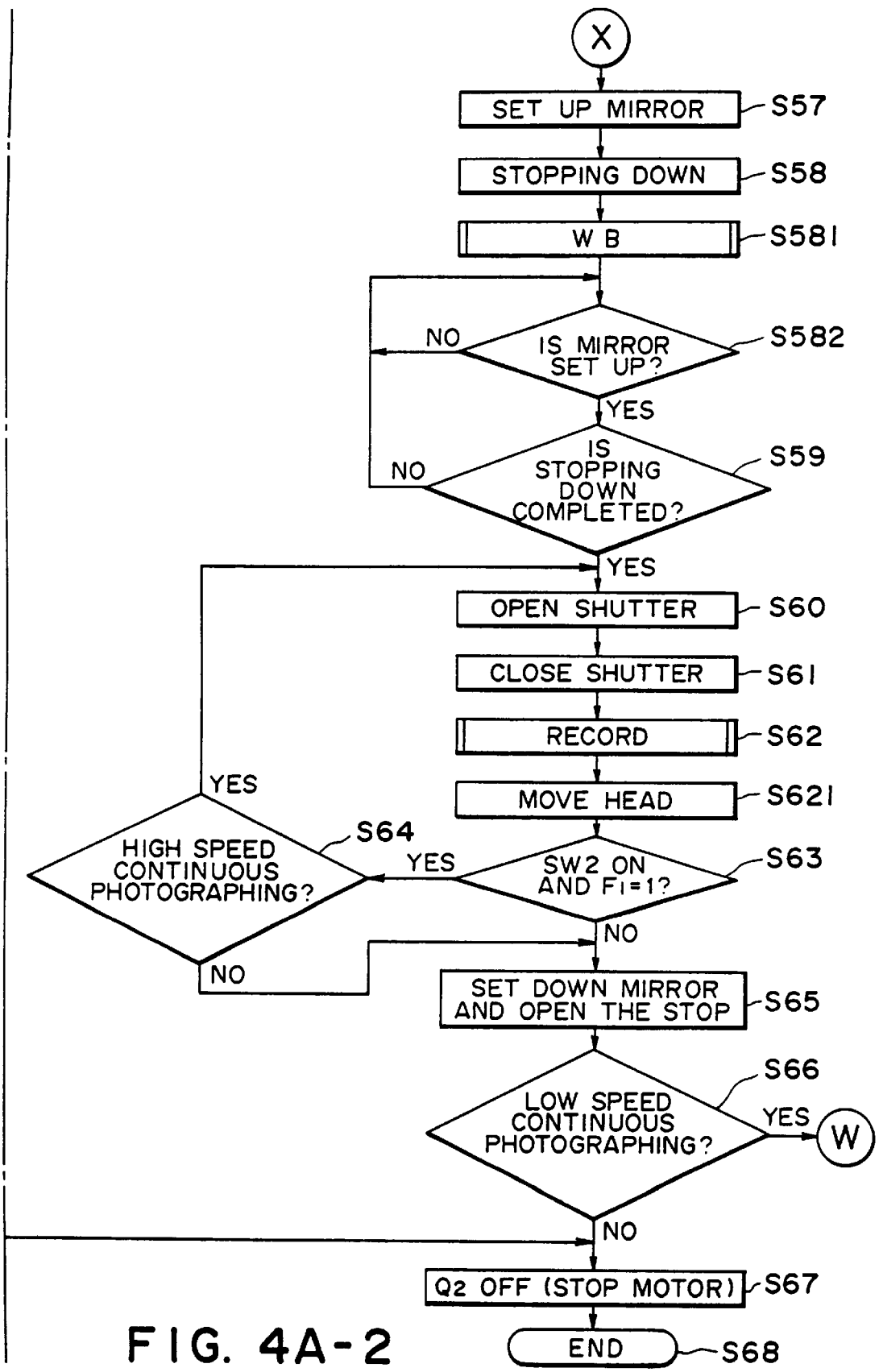
FIGS. 4A and 4B are flow charts respectively showing first and second embodiments of the programs used by the image pickup apparatus according to this invention.

FIG. 4A is a flow chart showing an example of a control sequence of the control circuit 17. FIGS. 5A to 5F are flow charts showing sub-routines of the flow chart of FIG. 4A.

The program starts at step S50. At step S501, information on the lens 2 (e.g., stop value, zoom ratio, F number and so on) is fetched. Next, photometry is performed at step S502 and a white balance control is performed at step S503. In particular, at the photometry step, light incident via the stop 3 and the mirror 4 is received by a light receiving element (not shown) and integrated to detect an object brightness level Bv. A stop value Av is then determined using an algorithm Av=Bv−Tv, Tv being a preset shutter time. At the white balance routine as shown in FIG. 5D, digital values of color temperature information inputted to the control circuit 17 in response to FG pulses are integrated for 25 msec at step S541. The integrated value CA is stored in a memory MA (not shown) in the control circuit 17 at step S542. At step S543, the data in the memory MA and the data in a memory MB (to be described later) are added together to form a color temperature data Co for 50 msec. The gains of the amplifiers 22a and 22b are controlled in accordance with the data Co.

Next, the sampled values are integrated again for 25 msec. The integrated value CB is newly stored in the memory MB (step S545). Next, the data in the memory MA and the renewed data in the memory MB are added together to form a new color temperature data Co for 50 msec which is about 25 msec later than the data Co at step S543. The gains of the amplifiers 22a and 22b are again controlled in accordance with this new data Co (step S546).

To obtain the color temperature data Co, an integrated value for 50 msec is used. The reason for this is to eliminate flicker of a fluorescent lamp.

Particularly, the frequency of the commercial power supply is 50 Hz or 60 Hz and the energy of flicker of a fluorescent lamp has a frequency two times higher than that of the power supply frequency. A color temperature changes with the flicker energy frequency. Therefore, a color temperature data at least for one period of flicker must be integrated so as to obtain a stable color temperature data. On the other hand, if the integration time becomes long, a response of white balance is degraded.

Thus, to integrate flicker light at the commercial power supply frequencies of 50 Hz and 60 Hz and hence at the flicker energy frequencies of 100 Hz and 120 Hz, at least 1/100 sec and 1/120 sec are respectively required. As a result, a minimum integration time for avoiding the influence of flicker becomes 50 msec which is a least common multiple of both integration times.

If the gains of the amplifiers 22a and 22b are controlled at each 50 msec, the response of white balance becomes poor. Therefore, in this embodiment a new color temperature data is fetched at each 25 msec to control the gains.

After the white balance routine S503, step S51 stands by until the release switch SW1 is turned on. If the switch is turned on, the disc motor 31 starts moving at a disc motor drive routine S52 shown in FIG. 5F.

Figure 7A:
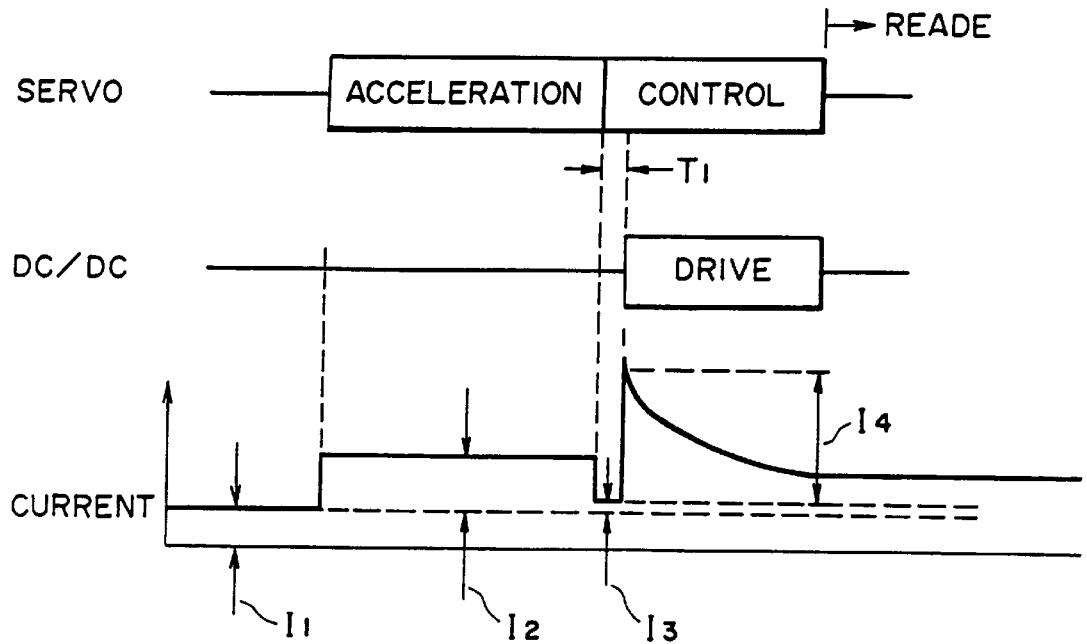
FIGS. 7A and 7B are timing charts respectively when an AC adapter is used and when a battery is used.

First at step S410, line p of the control circuit 17 (FIG. 2) is set at high level to turn on the transistor Q2 so that power is supplied to the regulator 122. Next, at step S420 it is checked if the switch SW3 is turned on or not. The switch SW3 is made to turn on if a battery package is used. In this case, a motor servo control is initiated at step S430 by the disc motor control circuit 18. A relatively large first current $I_2$ (FIG. 7A) is fed to the motor to drive it rapidly (current $I_1$ is a current flowing through the control circuit 17 after the switch SW1 is turned on).

The current is reduced to $I_3$ at step S431 to conduct a servo control. At the next step S440 the current $I_3$ is maintained as it is and thereafter, at step S450 line q is set at high level to drive the DC/DC converter. A maximum of $I_1+I_3+I_4$ instantaneous current flows at this time instant. Then at step S460 after a constant time $T_2$ the routine returns to the main flow program.

Figure 7B:
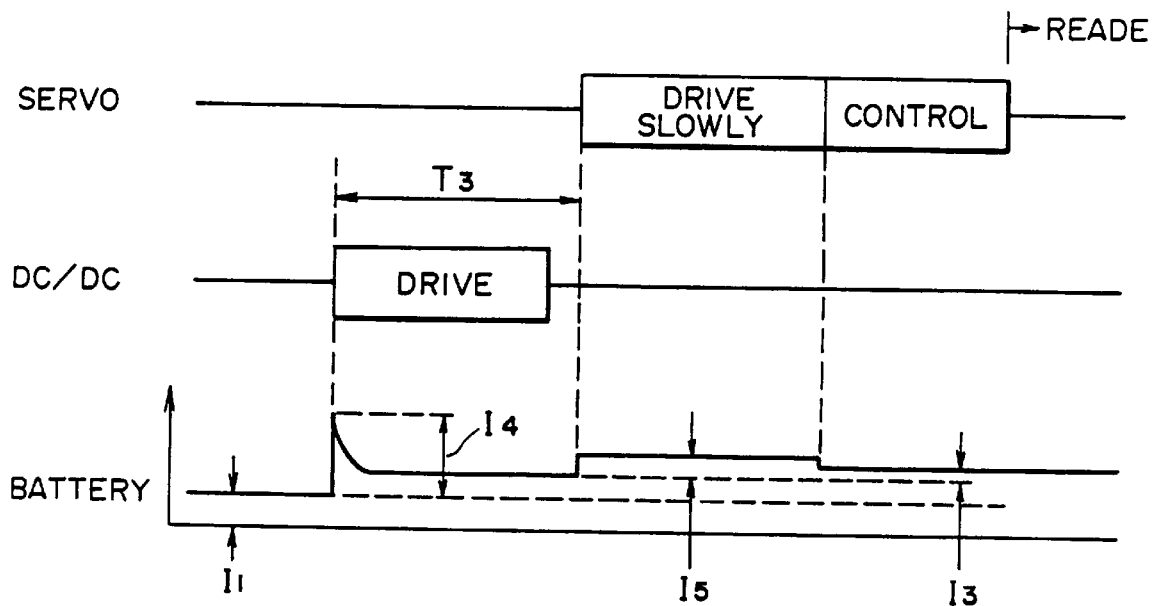

If an AC adapter is connected, the step S420 is negated. Therefore, at step S470 the line q is set at high level to drive the DC/DC converter. A maximum of $I_1+I_4$ instantaneous current flows at this time instant as shown in FIG. 7B.

After a constant time $T_3$ (step S480), the disc motor is driven by the disc motor control circuit 18. In this case, a second current $I_5$ smaller than the first current is fed to the motor. The reason for this is that since an AC adapter is used in a home, the disc motor is not needed to be driven rapidly, and a small current should be used. As an example of switching the first and second currents, a switch may be used in such a way that the first current is directly fed to the motor from the power supply, whereas the second current is fed to the motor via an attenuator. After supplying the current $I_5$ for a certain time at step S490, the current $I_5$ is reduced to $I_3$ at step S491 to switch to a servo control. After a constant time $T_4$ at step S500, the routine returns to the main flow.

As seen from the above embodiment of this invention, if a battery is used, the disc motor is driven first and then the DC/DC converter is initiated. Therefore, only a short time is required for image photographing and recording. On the other hand, if an AC adapter is used, the DC/DC converter is first initiated and the motor is driven slowly. Therefore, although it takes a long time for driving the disc motor and the DC/DC converter, a maximum current is suppressed so that a compact and simple AC adapter can be used.

After the sub-routine S52, it is checked if the motor rotation has become stable based on a FG (Frequency Generating) signal and a PG (Pulse Generating) signal, both well known in the art, supplied from the disc motor control circuit. If stable, "1" is set at flag F1 at step S522, whereas if not, "0" is set at flag F1 at step S523. Thereafter, an AE (Automatic Exposure) and AWB (Automatic White Balance) routine is executed at step S524. This routine executes automatic exposure control and automatic white balance control, an example of which is shown in FIGS. 5A to 5C.

In the AE and AWB routine, it is checked at step S200 if the release switch SW2 is turned on and if the flag F1 is "1"

(i.e., if a trigger for image photographing and recording has been issued and if the recording is possible). If not, information on the lens is read at step S201 to execute an exposure calculation and a white balance control using the newest data.

Thereafter, the flow advances to an photometry routine S202, an automatic white balance routine (AWB) S203, and an AE operation step S204. At the AE operation step S204, an AV value determined based on the photometry data is corrected using the newest lens data read at step S201. If affirmative at step S200, the steps 201 to 204 are skipped.

Thus, without waiting for the end of all the sequential steps, the photographing sequence to be described later can be followed.

The photometry routine S202 in FIG. 5A which is detailed as shown in FIG. 5B has step S205 similar to step S200. Therefore, although a photometry process is again executed at photometry step S206 if NO at step S205, the photometry process is not executed if YES and the flow advances to step S203.

Similarly, in the automatic white balance routine S203 detailed in FIG. 5C, step S207 similar to steps S200 and 203 is provided. Therefore, if YES at step S207, a display routine S525 follows without executing the white balance routine S208. The white balance routine S208 is detailed in FIG. 5D as described previously.

Figure 5E:
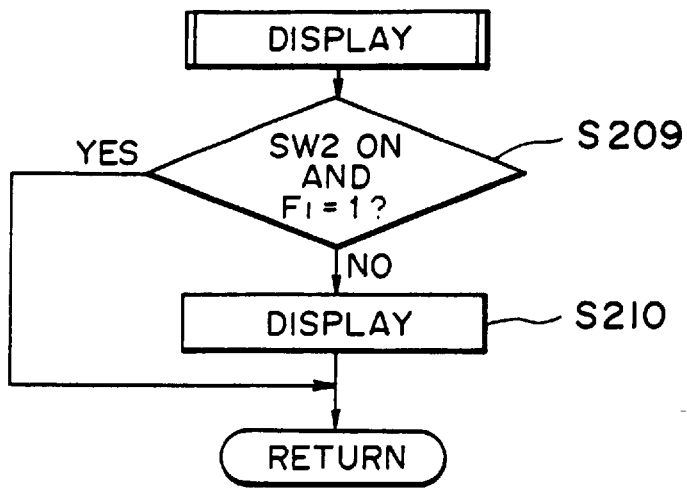
Figure 5F:
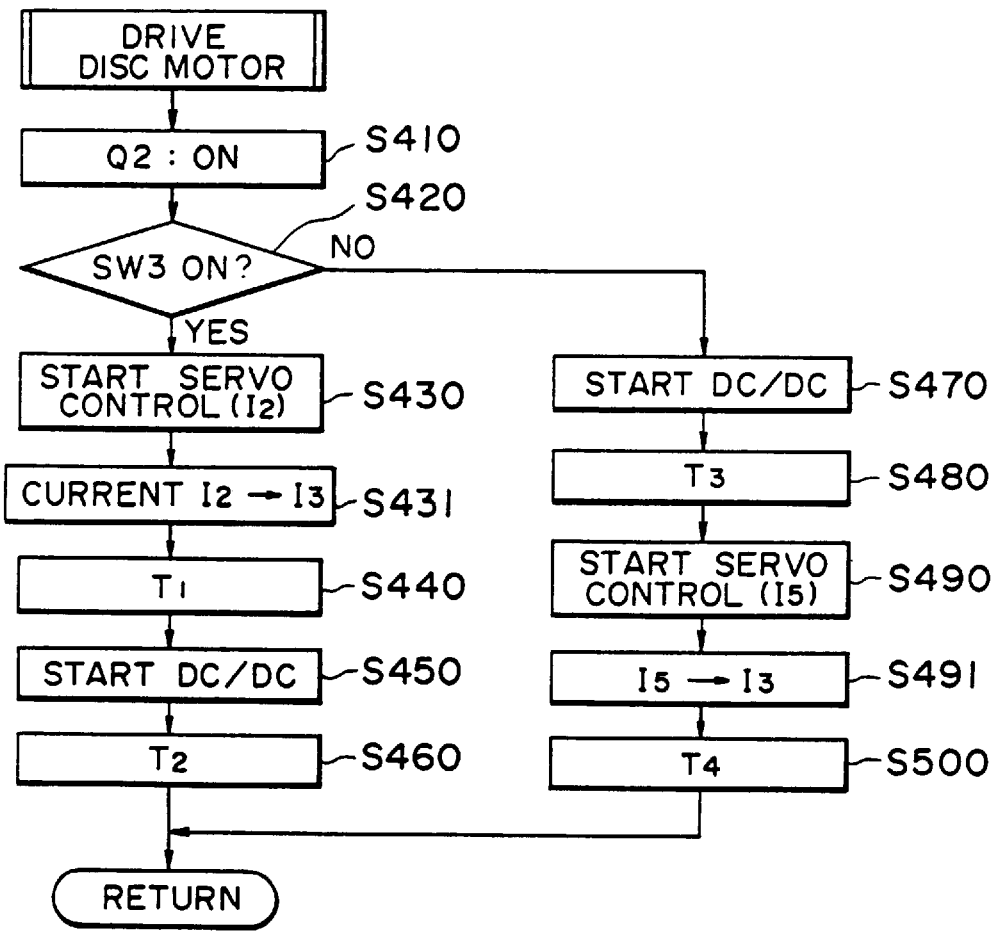

Also, in a display routine detailed in FIG. 5E, step S209 similar to steps S200, 205 and 207 is provided. Therefore, if YES at step S209, step S55 follows by skipping a display step S210.

After the display routine S525, it is checked at step S55 if the release switch SW1 is turned on or not. If not, the flow jumps to step S67 whereat the line p is set at low level to turn off the transistor Q2, stop the disc motor, and complete the program.

If YES at step S55, it is checked at step S56 if the release switch SW2 is turned on and if the flag F1 is "1", i.e., if a trigger for image photographing and recording has been issued and if the recording is possible. If NO, the flow resumes step S524 to repeat the photometry operation, white balance adjustment, display operation and so on.

If the release switch SW2 is turned on and if the flag F1 is "1" at steps S56, 200, 205, 207 and 209, then a photographing and recording sequential control starts. At step S57 the mirror is retracted or set up from the photographing optical path by the mirror driving apparatus. At step S58, the stop is moved down by the stop driving apparatus 14 from an open state to the stop-down value Av determined by the photometry data obtained at steps S502 and 206 and the preset shutter time.

Next, a white balance routine is again executed at step S581. This white balance routine is the same as that described in steps S541 to 546 shown in FIG. 5D.

Since it takes about 60 msec from the start of the mirror set-up and stopping-down operations at steps S57 and 58 to the end of the operations, the white balance operation can be executed within this time period.

After a lapse of short time from the end of the white balance routine at step S581, the end of mirror set-up and stopping-down are detected by sensors (not shown) to thereafter proceed to step S60.

At step S60 the shutter is opened by the shutter driving apparatus 14. After a lapse of the shutter time Tv, the shutter is closed at step S61. Then at step S62, the output from the image pickup element is recorded in the disc. At step S621 the head 29 is shifted to the next empty track of the disc.

Thereafter, it is again checked at step S63 if the release switch SW2 is turned on and if the flag F1 is "1". If YES, it is checked at step S64 based on the reading from the control unit 10 if a high speed continuous photographing mode is adopted. In case of a high speed continuous photographing mode, the flow returns to step S60 to repeat the photographing and recording operation such as the next step shutter opening and closing and the head shift to the next empty track. In this case, not only the photometry value and the stop value (Av) but also the white balance status are maintained unchanged. Therefore, the color does not change and images continuously photographed have a correct color balance. Further, as seen in the prior art, with the photometry data fixed because of the mirror set-up, if the color balance changes irrespective of a constant brightness level, a difference between continuously photographed images becomes more conspicuous. However, the embodiment of this invention does not have such a problem.

If the release switch SW2 is turned off at step S63, or if it is turned on and the flag F1 is "1" but a high speed continuous photographing mode is not adopted, the flow advances to step S65 whereat the mirror is returned to the optical path and the stop is again opened.

Then at step 66 it is checked, based on the reading from the control unit 10, if a low speed continuous photographing mode is adopted. If YES, the flow again begins with step S524 to execute photometry and white balance operations.

If NO, the flow advances to step S67 whereat the disc motor is stopped and the program terminates. As such, the photometry and white balance operations are effected for each frame in the low speed continuous photographing mode. This mode, with the finder being used, is usually adopted not for the case where high speed continuously photographed images are desired but for the case where a failure in photographing is serious and a fine change of an object must be taken account of. Thus, it is desirable that each frame has correct exposure and white balance.

In the above embodiment, the outputs of the color temperature sensors are sampled in response to FG pulses to convert them into a digital value for use in a white balance control. Therefore, dedicated sampling pulses are not required to be generated by a synchro signal oscillator for example. Further, it is advantageous in that the motor speed control by the control circuit and other controls can be easily performed in synchronization with the white balance control using the program.

In the embodiment, if the release switch is fully depressed at once, the flow may advance to the stopping-down step S58 without the photometry operation. To avoid such a case, steps S502 and S503 are provided to first execute the photometry and white balance operations. The steps are also provided to avoid a possibility that the white balance operation is executed only once for 50 msec at step S581, and hence results in an unstable white balance value.

As seen from the above embodiment, the photographing and recording operations can be executed immediately after the initiation of a photographing and recording trigger without employing an interruption function, thereby reducing a release time lag.

Further, according to the embodiment, a white balance adjustment is executed during the time while the incident light status to the image pickup element is controlled to change from the initial status to the predetermined status. The initial status means, for example, that the mirror is set down to the photographing optical axis to guide the light to the optical finder and the photometry apparatus 19, or means an initial lens focus position in case of an AF mechanism. The predetermined status means, for example, that the mirror is set up to a predetermined fixed position and the stop value is set at a calculated one, or that an in-focus state is achieved in case of an AF mechanism. Thus, without increasing a time lag between the initiation of a photographing and recording trigger and the end of the recording, the incident light control such as exposure and white balance control, and AF control can be executed precisely and at a short time. Incident light control means may include a shutter as well as a stop, a mirror and an AF mechanism.

Since the white balance control can be executed based on the white balance information obtained immediately before the exposure by the shutter, a precise white balance control properly following a change in light can be ensured.

Furthermore, even if the release switch is fully depressed at once, a correct white balance is assured without a significant release time lag. This can be realized using software. The software itself becomes idle and has no burden during the time while the driving apparatus is controlled to change the incident light from the initial status to the predetermined status.

The description of the embodiment has been directed to an electronic camera, but it is obvious that the invention can advantageously be applied to a camera using a silver salt film.

As seen from the description of the first embodiment of the present invention, the photographing and recording can be initiated without using an interruption function. Therefore, the program can be simplified with a small capacity of memory. In addition, the photographing and recording can be executed smoothly as if an interruption routine is used.

Further, the entire system including a motor is started at a short time with somewhat a large maximum current of a battery, whereas in case of an AC adapter a reduced maximum current is set irrespective of a slow start of the system. Thus, unnecessary burden on the AC adapter and a malfunction caused by a voltage drop can be avoided. A proper shutter chance of an image shot can be ensured in case of a battery.

Figures 2, 4B:
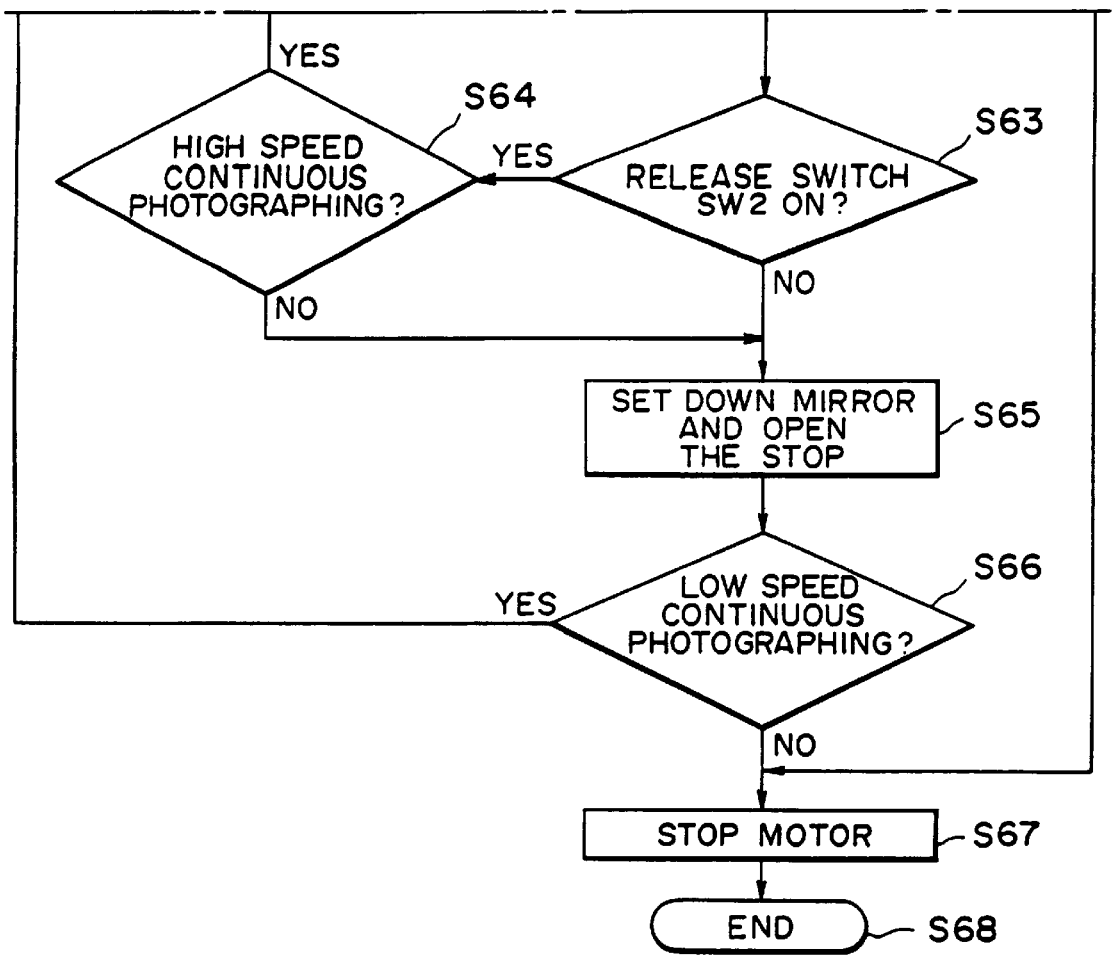
Figure 4B:
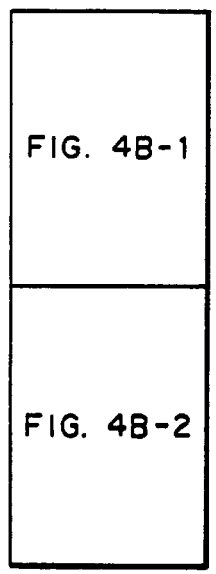
Figures 1, 4B:
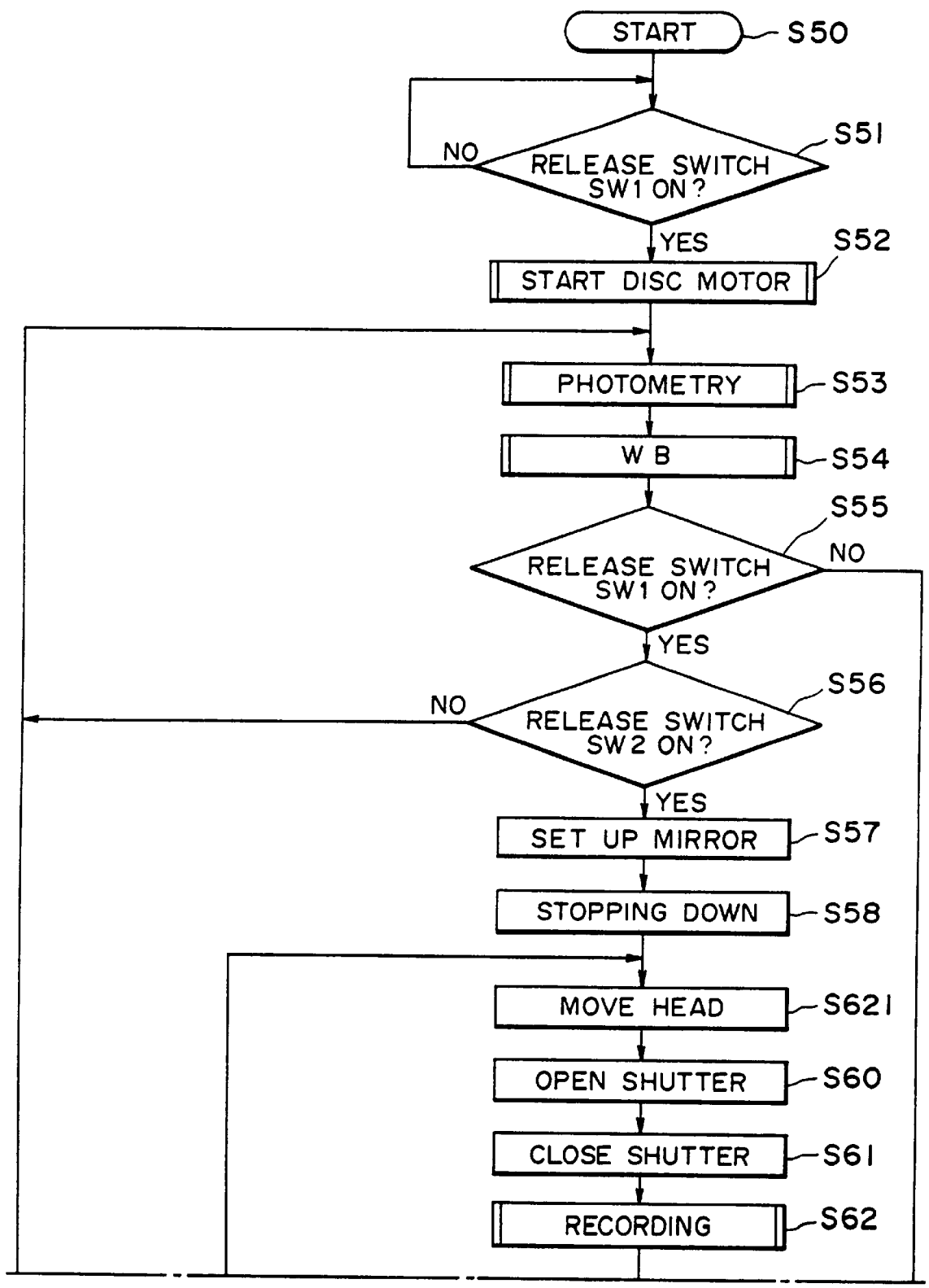

FIG. 4B is a flow chart of a second embodiment of the control sequence of the control circuit 17. The flow chart of FIG. 4B is a simplified version of that shown in FIG. 4A, wherein similar steps are represented by identical numbers.

The program starts from step S50 and waits at step S51 until the release switch SW1 is turned on. When the switch turns on, the disc motor 31 is driven at step S52 and is followed by the photometry step (step S53) and the white balance routine step S54). At the photometry step, light incident from the stop 3 and the mirror 4 is received by a light receiving element (not shown) and integrated to detect an object brightness level Bv. The stop value Av is calculated using an algorithm Av=Bv−Tv, where Tv is a preset shutter time. At the white balance routine S54, the gains of the amplifiers 22a and 22b are controlled at the steps shown in FIG. 5 as described previously.

After the white balance sub-routine S54, it is checked at step S55 if the release switch SW1 is turned on. If NO, the flow skips to step S67 whereat the disc motor is stopped and the program terminates.

If YES at step S55, it is checked at step S56 if the release switch SW2 is turned on, i.e., if a photographing and recording trigger is issued.

If the switch SW2 is not turned on, the flow resumes step S53 to repeat the photometry and white balance operations.

In this case, as described previously, the output of the light receiving element is integrated for each 50 msec by a loop including steps S53, 54, 55 and 56 to control the gains at each 25 msec.

If the release switch SW2 is turned on, the mirror is retracted from the photographing optical path by the mirror driving apparatus 13 at step S57. The stop is moved down by the stop driving apparatus 14 from a stop open status to the stop value Av determined by the photometry data obtained at step S53 and the preset shutter time.

Next, the head 29 is shifted at step S621 to the next empty track of the disc. The shutter is opened by the shutter driving apparatus 14 (step S60) and closed at step S61 after a lapse of the shutter time Tv. The output of the image pickup element is recorded in the disc at step S62.

The following steps S63 to 68 operate in a same manner as described with FIG. 4A. According to the embodiment shown in FIG. 4B, the white balance control can be achieved using a simplified flow control, with a fixed white balance during high speed continuous photographing.

Figure 8:
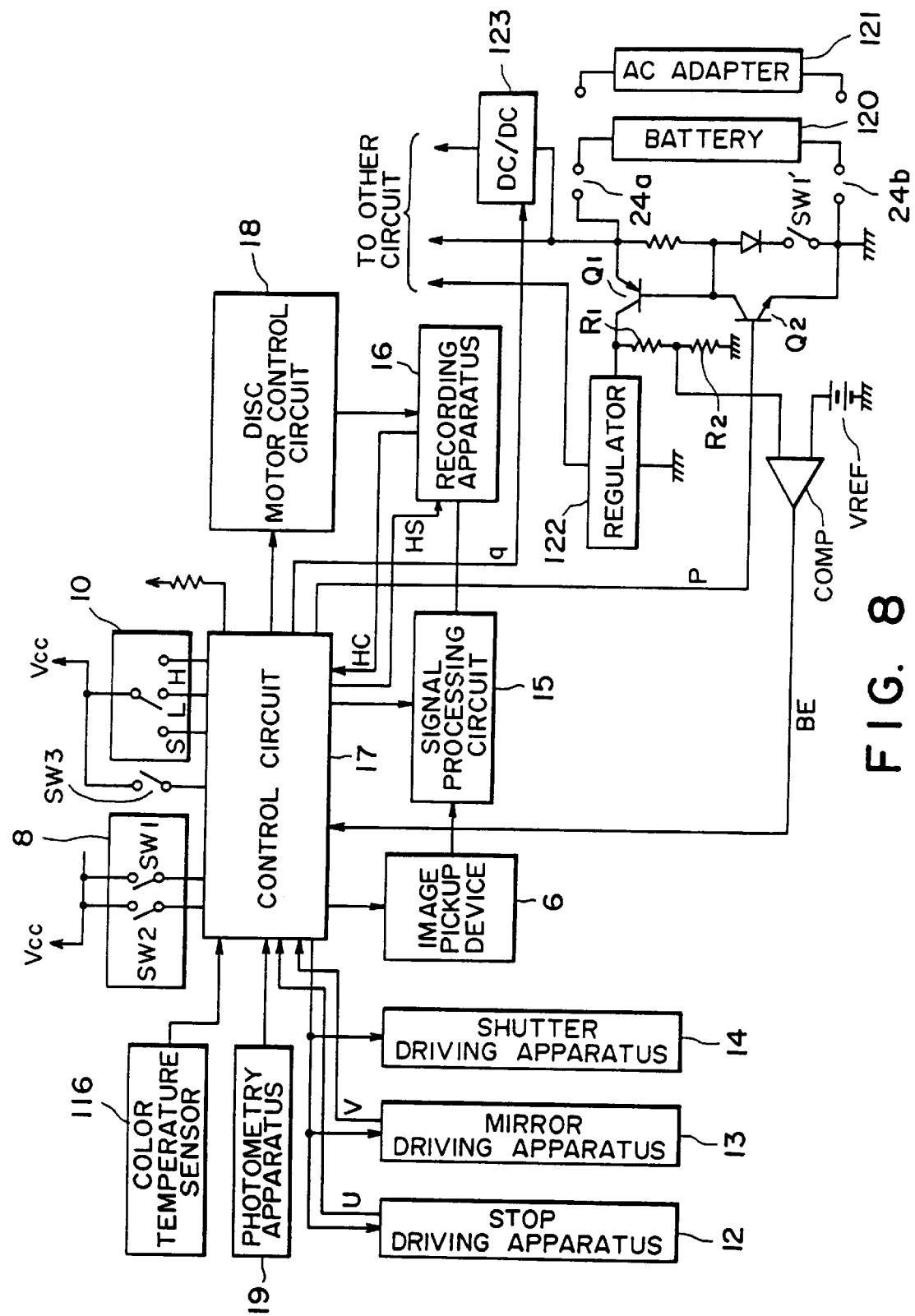
FIG. 8 is a block diagram showing a third embodiment of the image pickup apparatus according to the present invention.

FIG. 8 is a block diagram showing a third embodiment of the image pickup apparatus according to the present invention, wherein a drop in power supply level is detected to change a control sequence for driving the system.

Elements having similar functions to those shown in FIGS. 1 to 7 are represented by identical reference numbers.

In this embodiment, the stop driving apparatus outputs a signal U upon completion of opening the stop, and the mirror driving apparatus 13 outputs a signal V upon completion of mirror set-down. The control circuit 17 outputs a head shift signal Hs to drive a stepping motor described later and shift the head. Upon completion of the head shift, a signal HC is outputted from the motor and inputted to the control circuit 17.

Divider resistors R1 and R2 divide the power supply level to be supplied to the regulator. A comparator COMP outputs a low level signal BE when the power supply level is larger than a reference voltage Vref, and a high level signal BE when smaller than Vref.

Figure 9A:
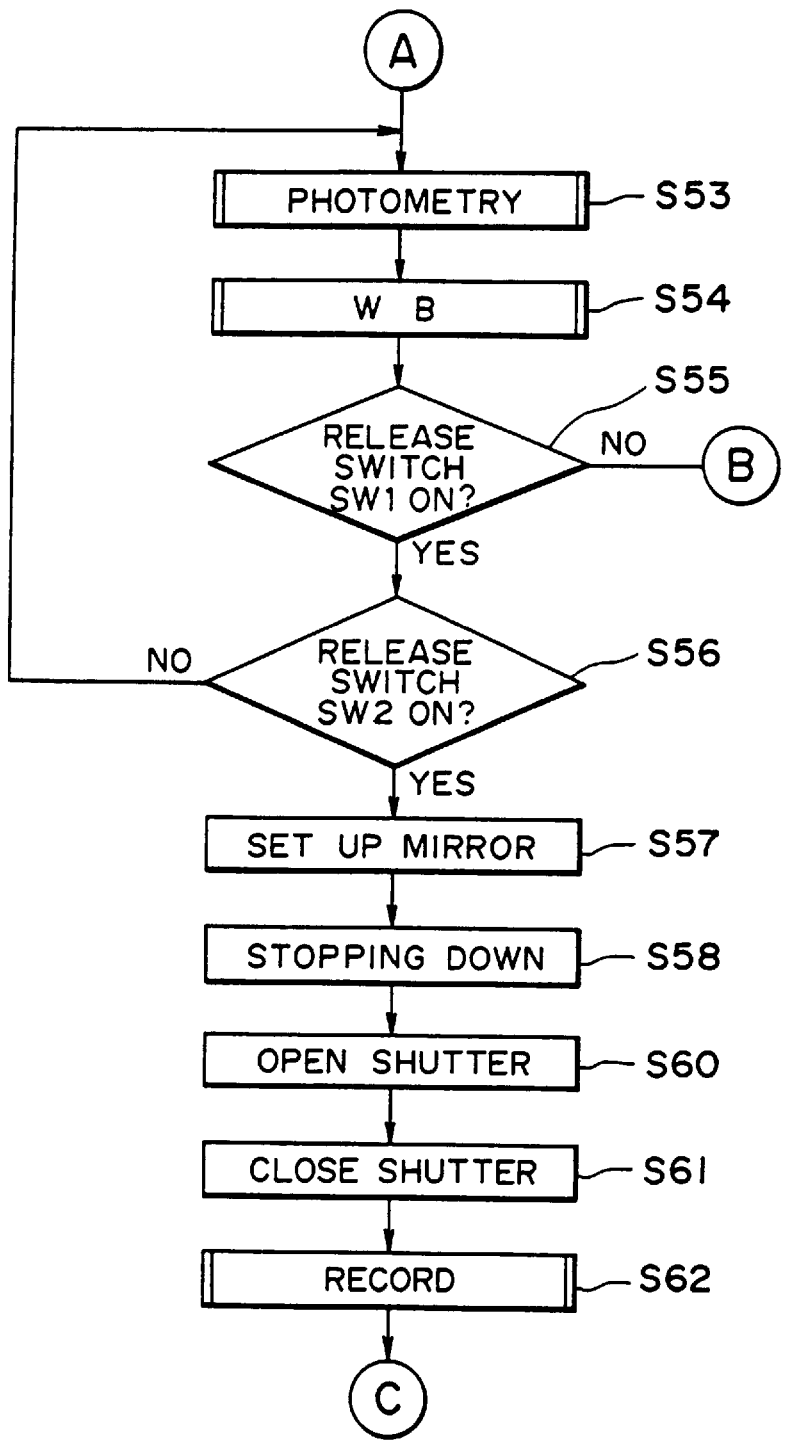
FIGS. 9A and 9B are flow charts illustrating the operation of the apparatus shown in FIG. 8.
Figure 9B:
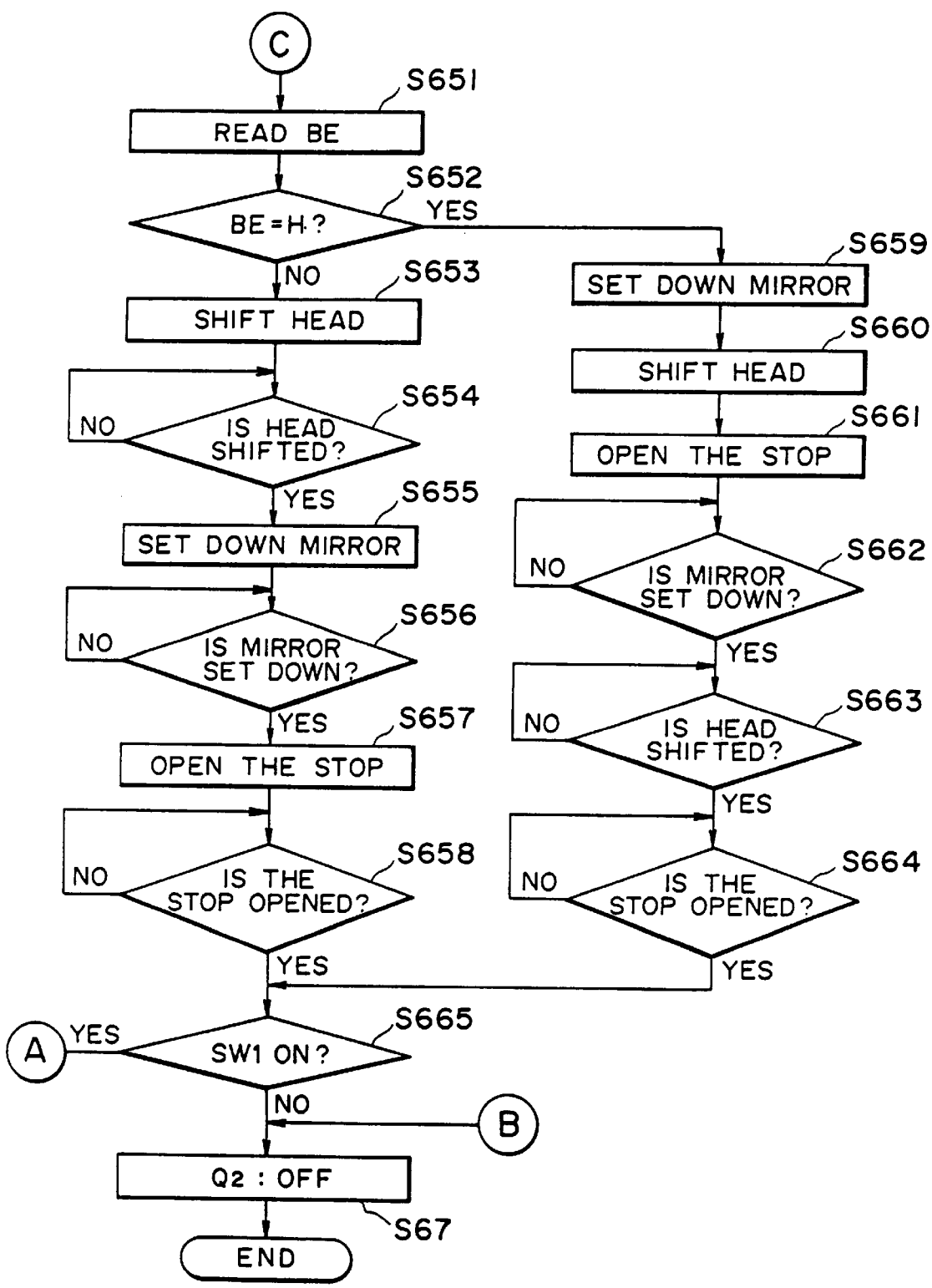

FIG. 9A and 9B are flow charts illustrating the operation of the apparatus shown in FIG. 8. Identical reference numbers to those in FIGS. 1 to 8 represent similar steps.

Step S52 shown in FIG. 4B advances to reference character A in FIG. 9A. Steps S53 to 58 in FIG. 9A are identical to those in FIG. 4B. Thereafter, without moving the head, the shutter is opened at step S60 and closed at step S61 to execute the recording at step S62.

The flow advances to step S651 shown in FIG. 9B whereat an output BE from the comparator COMP is read. If the signal BE is not at high level at step S652 because of a power supply voltage drop, then a motor 301 in the recording apparatus is driven to move a head carriage 300 and shift the head by one track.

If a head shift end signal HC is outputted from the motor 301 after completion of one track shift (step S654), the mirror is returned (set down) to the original position at step S655. Thereafter, if a mirror set-down end signal V is obtained from the mirror driving apparatus 13 at step S656, the stop is opened by the stop driving apparatus 12 at step S657. At step S658, if a stop open end signal U is obtained from the stop driving apparatus, the flow advances to step S665.

As seen from the above, if the power supply level drops, the operations such as head motion, mirror set-down, stop opening are sequentially performed so that power supply consumptions do not occur at the same time, to thereby eliminate a voltage drop caused by a rapid current discharge and a malfunction.

If the output of the comparator COMP is at low level at step S652 because the power supply level does not drop, then the three operations including the mirror set-down, head motion and stop opening are executed substantially at a same time at steps S659 to 661.

The mirror set-down end signal V, head shift end signal HC, and stop open end signal U are waited for respectively at steps S662 to 664. Thereafter, the flow advances to step S665. As seen from the above, when the power supply voltage is sufficiently high, the three operations including the mirror set-down, head motion and stop opening are executed substantially at the same time. Therefore, preparation for the next photographing can be completed quickly.

At step S665 it is checked if the switch SW1 is turned on. If not, the output P of the control circuit 17 is set at low level to turn off the transistor Q2 (step S57) and stop supplying the power, to thus terminate the program.

If the switch SW1 is turned on at step S665, it can be considered that the operator still wants to take a photograph so that the flow resumes at step S53.

In the above embodiment, after the photographing, the three operations including the mirror set-down, head motion and stop opening are sequentially executed one after another. Similarly, in steps S57 and 58 immediately before photographing, the control operations for the stop, mirror and others may be executed sequentially when the power supply drops, or substantially at a same time when the power supply does not drop.

Further in the above embodiment, the timings for supplying power to a plurality of driving apparatuses are changed in accordance with the first and second conditions of the power supply. However, the timings may be changed in accordance with a plurality of finely divided conditions of the power supply.

According to the third embodiment of the present invention, discrimination means judges if the power supply capability has been degraded or not. Based on this judgement, control means switches between the two operations, one for supplying power to the plurality of motors substantially at a same time and a other for supplying sequentially with the predetermined interval. Therefore, the overall system operates quickly if the power supply capability is sufficient, whereas it operates slowly if the capability has been degraded. Thus, a rapid voltage drop is avoided to accordingly extend a service life of a power supply.

Figures 10, 10B:
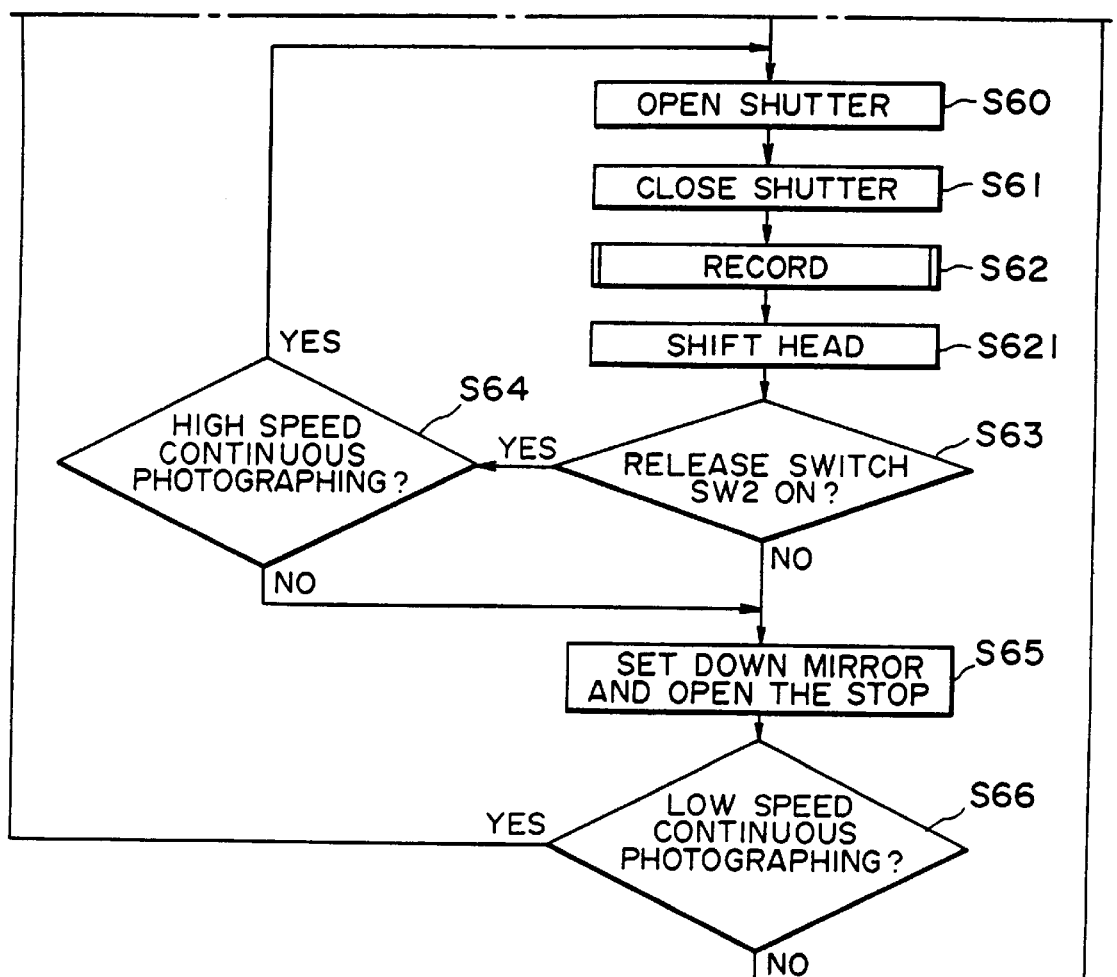
FIG. 10 is a flow chart of a fourth embodiment according to the invention.
Figure 10A:
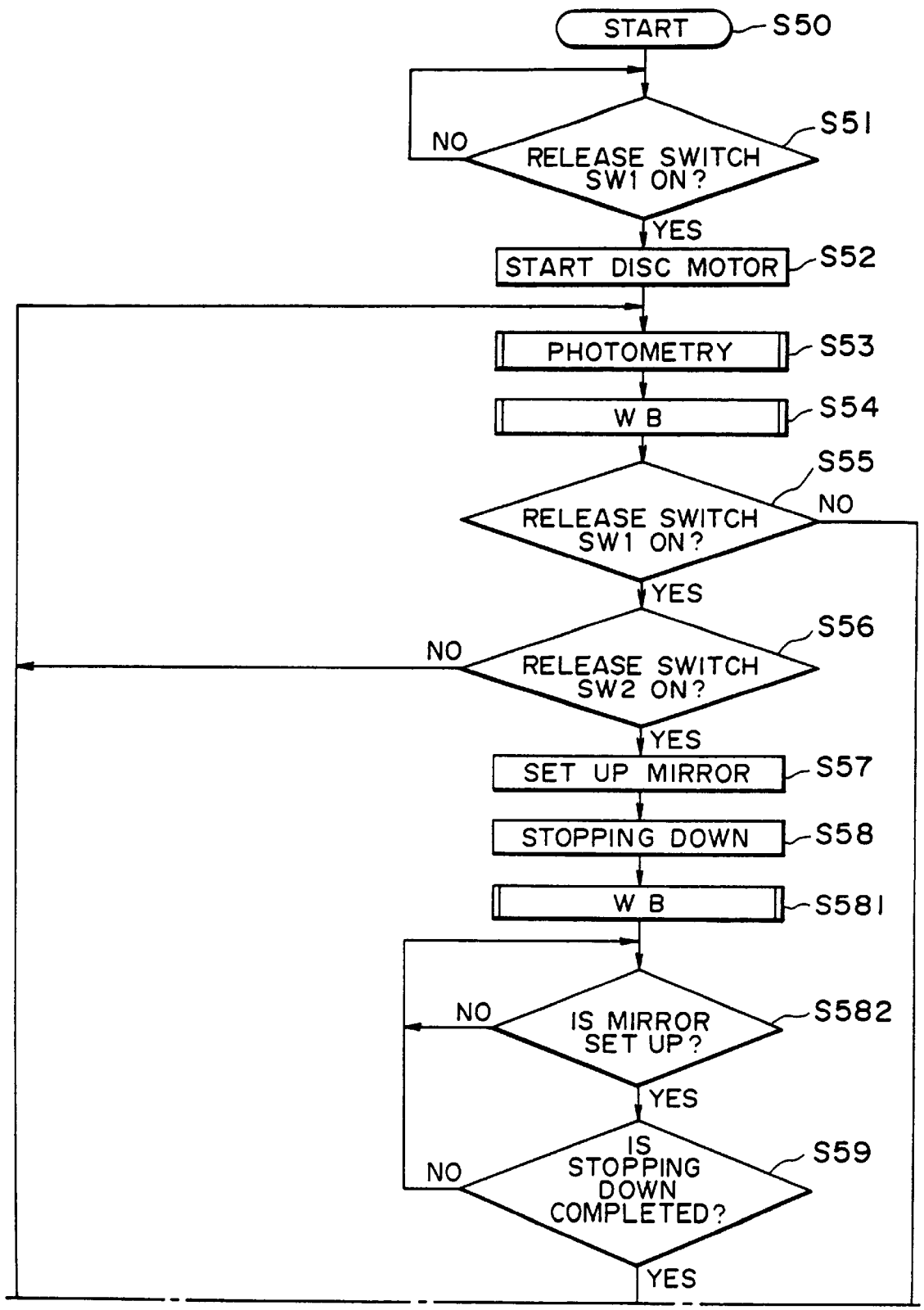

FIG. 10 is a flow chart showing the fourth embodiment of the control sequence of the control circuit 17 according to the present invention. Similar steps to those in FIGS. 1 to 9 are represented by identical reference numbers.

The control sequence to step S58 after the program starts at step S50 is identical to that described with reference to FIG. 4B, so the description therefor is omitted.

The white balance routine is executed at step S581. This routine is identical with that described with reference to steps S541 to 546 in FIG. 5D.

It takes about 60 msec for the operation starting from the mirror set-up and stopping-down at steps S57 and 58 to the end thereof. Thus, the white balance operation can be sufficiently executed within this time.

After a short time lapse from the end of the white balance routine at step S581, if it is detected by sensors (not shown) that the mirror set-up and stopping-down have been completed, the flow advances to step S60 whereat the shutter is opened by the shutter driving apparatus 14. After a lapse of the shutter time Tv, the shutter is closed at step S61. The output of the image pickup element is recorded in the disc at step S62 and thereafter, the head 29 is shifted to the next empty track of the disc at step S621.

The following steps S63 to 68 are identical with those shown in FIG. 4B, so the description therefor is omitted.

Figure 11B:
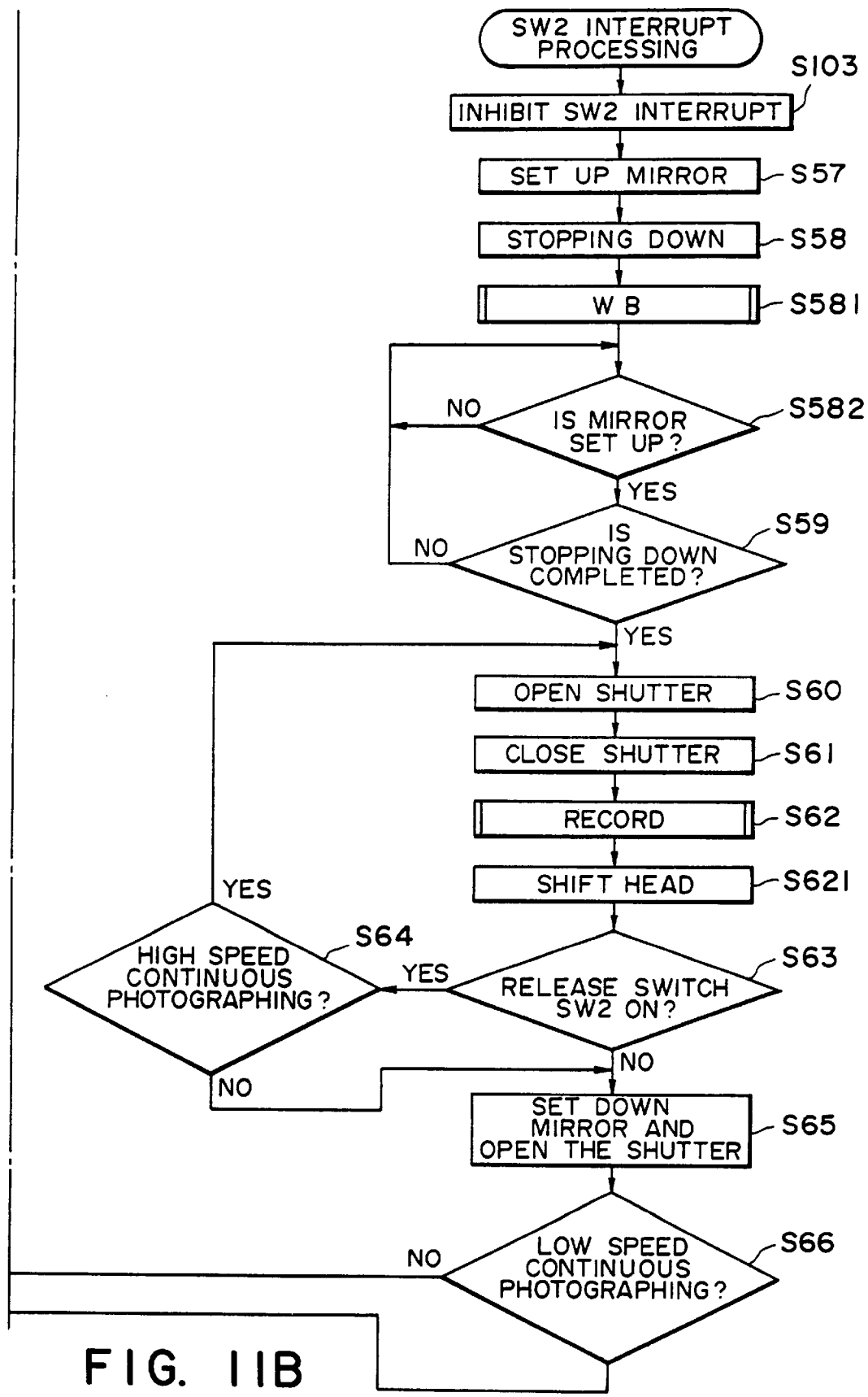
FIG. 11 is a flow chart of a fifth embodiment according to the invention.

A flow chart of the fifth embodiment of the control sequence of the control circuit is shown in FIG. 11.

Steps having identical functions as those shown in FIGS. 1 to 10 are represented by the same reference numerals.

In this embodiment, the operation of the switch SW2 is executed using an interrupt processing, which is different from the fourth embodiment.

If the release switch SW1 is turned on at step S55, an interruption of the switch SW2 is permitted at step S43 and the flow returns to step S53. Whereas if the release switch SW1 is turned off at step S55, the interruption of the switch SW2 is inhibited at step 101 to stop the disc motor at step S67. Then the flow returns to step S51.

In the SW2 interrupt processing, the interruption of the SW2 is temporarily stopped at step S103 and thereafter, the processes at steps S57 to 66 as described previously are executed. In case of a low speed continuous photographing mode at step S66, the flow returns to step S53 in the same manner as the fourth embodiment. If not, the flow returns to step S67 to stop the motor and resume step S51.

As described above, a white balance adjustment is executed during the time while the incident light status to the image pickup element is controlled to change from the initial status to the predetermined status. The initial status means, for example, that the mirror is set down to the photographing optical axis to guide the light to the optical finder and the photometry apparatus 19, or means an initial lens focus position in case of an AF mechanism. The predetermined status means, for example, that the mirror is retracted to a predetermined fixed position and the stop value is set at a calculated one, or that an in-focus state is achieved in case of an AF mechanism. Thus, without increasing a time lag between the initiation of a photographing and recording trigger and the end of the recording, the incident light control such as exposure and white balance control, and AF control can be executed precisely and quickly. Incident light control means may include a shutter as well as a stop, mirror and AF mechanism.

Since the white balance control can be executed based on the white balance information obtained immediately before the exposure by the shutter, a precise white balance control properly following a change in light can be ensured.

Furthermore, even if the release switch is fully depressed at once, a correct white balance is assured without a significant release time lag. This can be realized using software. The software itself becomes idle and has no burden during the time while the driving apparatus is controlled to change the incident light from the initial status to the predetermined status.

What is claimed is:

1. A recording/reproducing apparatus comprising:
   a motor driving relative displacement at high speed of at least one of a recording medium and a head;
   a first power supply capable of discharging a first current;
   a second power supply capable of discharging a second current less than the first current;

internal circuitry including image pickup elements;

a booster circuit supplying power to the internal circuitry; and control means actuating said booster circuit after said motor is supplied with the first current from said first power supply and controlling said second power supply to supply the second current to said motor after said booster circuit is actuated.

2. A recording/reproducing apparatus according to claim 1, wherein said first power supply includes a battery.

3. A recording/reproducing apparatus according to claim 1, wherein said first power supply includes an AC/DC converter.

4. A motor control apparatus capable of selectively using a first power supply which can discharge a first electric current and a second power supply which can discharge a second electric current, said apparatus comprising:

a motor;

a booster circuit for driving internal circuitry other than said motor; and control means for controlling said motor so that said booster circuit is actuated after the first electric current is supplied to said motor by the first power supply, and the second electric current is supplied by the second power supply to said motor after said booster circuit is actuated.

5. An apparatus according to claim 4, further comprising a recording/reproducing device which records and reproduces a signal.

6. An apparatus according to claim 5, wherein said motor is used to result in relative movement of a head and a recording medium.

* * * * *

UNITED STATES PATENT AND TRADEMARK OFFICE
CERTIFICATE OF CORRECTION

PATENT NO. : 5,872,433

DATED : February 16, 1999

INVENTOR(S) : SHINJI SAKAI

It is certified that error appears in the above-identified patent and that said Letters Patent is hereby corrected as shown below:

COLUMN 2,
Line 39, "use" should read --uses--; and
Line 47, "arises" should read --arise--.
COLUMN 3,
Line 1, "like" should read --like,--.
COLUMN 7,
Line 3, "applies" should read --apply--.
COLUMN 9,
Line 6, "an" should read --a--;
Line 59, "short" should read --a short--; and
Line 61, "are" should read --is--.
COLUMN 13,
Line 44, "a" (first occurrence) should read --the--, and "a" (second occurrence) should read --the--.

Signed and Sealed this

Twenty-first Day of September, 1999

Attest:

Q. TODD DICKINSON

*Attesting Officer*    Acting Commissioner of Patents and Trademarks